United States Patent
Hsueh et al.

(10) Patent No.: US 12,416,790 B2
(45) Date of Patent: Sep. 16, 2025

(54) OPTICAL IMAGING LENS SYSTEM, IMAGE CAPTURING UNIT AND ELECTRONIC DEVICE

(71) Applicant: LARGAN PRECISION CO., LTD., Taichung (TW)

(72) Inventors: Chun-Che Hsueh, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 654 days.

(21) Appl. No.: 17/834,829

(22) Filed: Jun. 7, 2022

(65) Prior Publication Data

US 2023/0305270 A1 Sep. 28, 2023

(30) Foreign Application Priority Data

Mar. 28, 2022 (TW) .................................. 111111658

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ...... G02B 13/0045; G02B 13/18; G02B 9/60; G02B 3/0037
USPC ......................................................... 359/714
See application file for complete search history.

(56) References Cited

U.S. PATENT DOCUMENTS

| | | |
|---|---|---|
| 4,046,460 A | 9/1977 | Koizumi |
| 9,310,585 B2 | 4/2016 | Park |
| 9,453,987 B2 | 9/2016 | Noda |
| 9,575,290 B2 | 2/2017 | Kondo |
| 9,880,373 B2 | 1/2018 | Hsu |
| 10,288,845 B2 | 5/2019 | Chen |
| 10,437,017 B2 | 10/2019 | Lin |
| 11,243,371 B2 | 2/2022 | Jhang |

(Continued)

FOREIGN PATENT DOCUMENTS

| | | |
|---|---|---|
| CN | 106154502 | 11/2016 |
| CN | 110221411 | 9/2019 |

(Continued)

OTHER PUBLICATIONS

TW Office Action dated Jan. 4, 2023 as received in Application No. 111111658.

(Continued)

*Primary Examiner* — Bumsuk Won
*Assistant Examiner* — Seth D Moser
(74) *Attorney, Agent, or Firm* — Maschoff Brennan

(57) ABSTRACT

An optical imaging lens system includes five lens elements which are, in order from an object side to an image side along an optical path: a first lens element, a second lens element, a third lens element, a fourth lens element and a lens element. Each of the five lens elements has an object-side surface facing toward the object side and an image-side surface facing toward the image side. The first lens element has positive refractive power. The image-side surface of the fourth lens element is concave in a paraxial region thereof. The object-side surface of the fifth lens element is convex in a paraxial region thereof, and the image-side surface of the fifth lens element is concave in a paraxial region thereof.

33 Claims, 24 Drawing Sheets

(56) References Cited

U.S. PATENT DOCUMENTS

| | | | | |
|---|---|---|---|---|
| 2010/0134904 A1* | 6/2010 | Tsai | ................ | G02B 9/60 |
| | | | | 359/764 |
| 2015/0168695 A1 | 6/2015 | Tsai et al. | | |
| 2015/0185442 A1* | 7/2015 | Katsuragi | ................ | G02B 9/60 |
| | | | | 348/360 |
| 2017/0045717 A1* | 2/2017 | Park | ................ | G02B 13/0045 |
| 2018/0052383 A1 | 2/2018 | Miyagishima | | |
| 2019/0004289 A1* | 1/2019 | Liao | ................ | G02B 13/0045 |
| 2019/0113714 A1* | 4/2019 | Hsueh | ................ | G02B 13/0045 |
| 2021/0055513 A1* | 2/2021 | Li | ................ | G02B 9/60 |
| 2021/0181470 A1 | 6/2021 | Lv | | |
| 2022/0137374 A1* | 5/2022 | Shin | ................ | G02B 9/64 |
| | | | | 359/708 |

FOREIGN PATENT DOCUMENTS

| | | |
|---|---|---|
| CN | 111929843 | 11/2020 |
| CN | 214846000 | 11/2021 |
| CN | 113985571 | 1/2022 |
| JP | S63116112 | 5/1988 |
| TW | 201415075 A | 4/2014 |
| WO | 2022/228189 A1 | 11/2022 |
| WO | 2023/274041 A1 | 1/2023 |

OTHER PUBLICATIONS

European Search Report dated Feb. 24, 2023 as received in Application No. 22181190.4.

* cited by examiner

OPTICAL IMAGING LENS SYSTEM, IMAGE CAPTURING UNIT AND ELECTRONIC DEVICE

RELATED APPLICATIONS

This application claims priority to Taiwan Application 111111658, filed on Mar. 28, 2022, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element has positive refractive power. The image-side surface of the fourth lens element is concave in a paraxial region thereof. The object-side surface of the fifth lens element is convex in a paraxial region thereof, and the image-side surface of the fifth lens element is concave in a paraxial region thereof.

When a focal length of the optical imaging lens system is f, a focal length of the second lens element is f2, a focal length of the fourth lens element is f4, a focal length of the fifth lens element is f5, a curvature radius of the object-side surface of the third lens element is R5, a curvature radius of the image-side surface of the third lens element is R6, a curvature radius of the image-side surface of the fifth lens element is R10, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied:

$-1.85 < f/f4 < 0.25;$ $-0.20 < f/f5 < 2.00;$ $-1.30 < (R5+R6)/(R5-R6) < 2.00;$ $0.30 < |f5/f2| < 2.60;$ $0.55 < T34/(T12+T23+T45) < 5.50;$ $0.60 < T12/T45 < 6.00;$ and $0.20 < f/R10.$ According to another aspect of the present disclosure, an optical imaging lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The image-side surface of the fourth lens element is concave in a paraxial region thereof, and the image-side surface of the fourth lens element has at least one inflection point. The image-side surface of the fifth lens element is concave in a paraxial region thereof, and the image-side surface of the fifth lens element has at least one inflection point. The optical imaging lens system further comprises an aperture stop located at an object side of the first lens element.

When a focal length of the optical imaging lens system is f, a focal length of the second lens element is f2, a focal length of the fourth lens element is f4, a focal length of the fifth lens element is f5, a curvature radius of the object-side surface of the third lens element is R5, a curvature radius of the image-side surface of the third lens element is R6, a central thickness of the second lens element is CT2, a central thickness of the third lens element is CT3, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied:

$-2.00 < f/f4 < 0.30;$ $-0.20 < f/f5 < 2.00;$ $-1.00 < (R5+R6)/(R5-R6) < 2.10;$ $0.10 < |f5/f2| < 5.50;$ $0.75 < (CT2+T23+CT3)/T34 < 2.00;$ and $0.60 < T12/T45 < 40.0.$ According to another aspect of the present disclosure, an optical imaging lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The image-side surface of the fourth lens element is concave in a paraxial region thereof, and the image-side surface of the fourth lens element has at least one inflection point. The image-side surface of the fifth lens element is concave in a paraxial region thereof, and the image-side surface of the fifth lens element has at least one inflection point.

When a focal length of the optical imaging lens system is f, a focal length of the fourth lens element is f4, a focal length of the fifth lens element is f5, a curvature radius of the object-side surface of the third lens element is R5, a curvature radius of the image-side surface of the third lens element is R6, a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following conditions are satisfied:

$-2.00<f/f4<0.12;$ $-0.20<f/f5<2.00;$ $-1.00<(R5+R6)/(R5-R6)<2.20;$ $0.30<CT1/CT2<2.20;$ $1.20<CT1/T45<15.00;$ $0.00<CT3/T34<0.85;$ and $0.38<T12/T23<2.20.$ According to another aspect of the present disclosure, an optical imaging lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the first lens element is convex in a paraxial region thereof. The fourth lens element has negative refractive power, and the image-side surface of the fourth lens element is concave in a paraxial region thereof. The fifth lens element has positive refractive power, and the image-side surface of the fifth lens element is concave in a paraxial region thereof.

When a focal length of the optical imaging lens system is f, a focal length of the fourth lens element is f4, a focal length of the fifth lens element is f5, an axial distance between the second lens element and the third lens element is T23, an axial distance between the third lens element and the fourth lens element is T34, an axial distance between the object-side surface of the first lens element and the image-side surface of the fifth lens element is TD, an axial distance between the image-side surface of the fifth lens element and an image surface is BL, a curvature radius of the object-side surface of the fourth lens element is R7, and a curvature radius of the image-side surface of the fifth lens element is R10, the following conditions are satisfied:

$-3.00<f/f4<0.00;$ $0.00<f/f5<3.00;$ $1.80<T34/T23<30.00;$ $1.30<TD/BL<3.00;$ and $0.85<(R7+R10)/(R7-R10).$ According to another aspect of the present disclosure, an image capturing unit includes one of the aforementioned optical imaging lens systems and an image sensor, wherein the image sensor is disposed on the image surface of the optical imaging lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element can have positive refractive power. Therefore, it is favorable for reducing the sizes of the first lens element and the second lens element of the optical imaging lens system. The object-side surface of the first lens element can be convex in a paraxial region thereof. Therefore, it is favorable for adjusting the lens shape of the first lens element so as to correct aberrations such as astigmatism.

The image-side surface of the third lens element can be convex in a paraxial region thereof. Therefore, it is favorable for adjusting the travelling direction of light so as to increase the image surface.

The fourth lens element can have negative refractive power. Therefore, it is favorable for balancing the refractive power configuration at the image side of the optical imaging lens system so as to correct aberrations. The image-side surface of the fourth lens element is concave in a paraxial region thereof. Therefore, it is favorable for adjusting the lens shape of the image-side surface of the fourth lens element so as to reduce the spot size on the central field of view. The image-side surface of the fourth lens element can have at least one inflection point. Therefore, it is favorable for adjusting the travelling direction of light so as to balance the size distribution of the optical imaging lens system. Please refer to FIG. 21, which shows a schematic view of inflection points P of the image-side surface of the fourth lens element E4 according to the 1st embodiment of the present disclosure.

Figure 21:
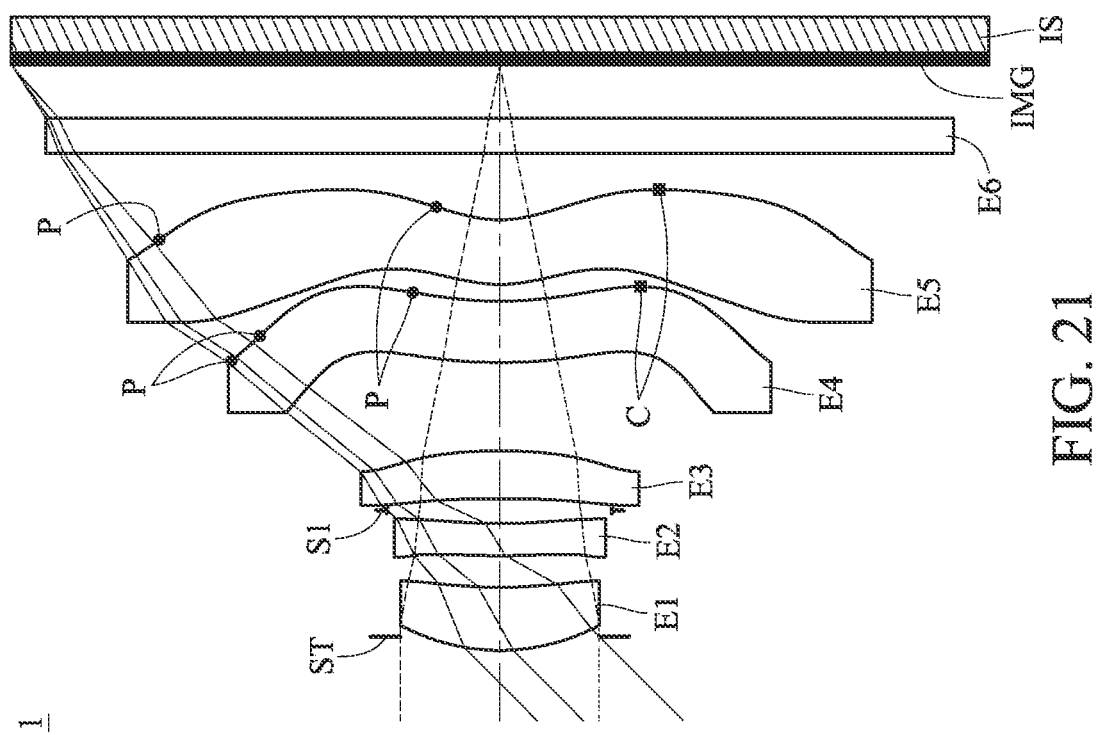
FIG. 21 shows a schematic view of several inflection points and several critical points of the lens elements according to the 1st embodiment of the present disclosure.

The fifth lens element can have positive refractive power. Therefore, it is favorable for reducing the size at the image side of the optical imaging lens system. The object-side surface of the fifth lens element can be convex in a paraxial region thereof. Therefore, it is favorable for adjusting the lens shape of the object-side surface of the fifth lens element so as to correct aberrations such as spherical aberration. The image-side surface of the fifth lens element is concave in a paraxial region thereof. Therefore, it is favorable for adjusting the lens shape of the image-side surface of the fifth lens element so as to reduce the back focal length. The image-side surface of the fifth lens element can have at least one inflection point. Therefore, it is favorable for adjusting the light incident angle on the image surface so as to reduce influence of temperature change on the spot size on the peripheral field of view. Please refer to FIG. 21, which shows a schematic view of inflection points P of the image-side surface of the fifth lens element E5 according to the 1st embodiment of the present disclosure. The abovementioned inflection points on the fourth lens element and the fifth lens element in FIG. 21 are only exemplary. Each of lens surfaces in various embodiments of the present disclosure may also have one or more inflection points.

According to the present disclosure, the optical imaging lens system can further include an aperture stop located at an object side of the first lens element. Therefore, it is favorable for adjusting the position of the aperture stop in the optical imaging lens system so as to obtain a proper balance between increase in relative illuminance on the peripheral field of view and increase in the field of view.

When a focal length of the optical imaging lens system is f, and a focal length of the fourth lens element is f4, the following condition is satisfied: $-3.00<f/f4<0.00$. Therefore, it is favorable for adjusting the refractive power of the fourth lens element so as to correct astigmatism of aberrations. Moreover, the following condition can also be satisfied: $-2.00<f/f4<0.30$. Moreover, the following condition can also be satisfied: $-2.00<f/f4<0.12$. Moreover, the following condition can also be satisfied: $-1.85<f/f4<0.25$.

When the focal length of the optical imaging lens system is f, and a focal length of the fifth lens element is f5, the following condition is satisfied: $0.00<f/f5<3.00$. Therefore, it is favorable for adjusting the refractive power of the fifth lens element so as to reduce the back focal length. Moreover, the following condition can also be satisfied: $-0.20<f/f5<2.00$.

When a curvature radius of the object-side surface of the third lens element is R5, and a curvature radius of the image-side surface of the third lens element is R6, the following condition can be satisfied: $-1.30<(R5+R6)/(R5-R6)<2.00$. Therefore, it is favorable for adjusting the lens shape and the refractive power of the third lens element so as to increase light convergence quality on the central and peripheral fields of view. Moreover, the following condition can also be satisfied: $-1.00<(R5+R6)/(R5-R6)<2.20$. Moreover, the following condition can also be satisfied: $-1.00<(R5+R6)/(R5-R6)<2.10$. Moreover, the following condition can also be satisfied: $-0.50<(R5+R6)/(R5-R6)<1.95$. Moreover, the following condition can also be satisfied: $0.00<(R5+R6)/(R5-R6)<1.90$.

When a focal length of the second lens element is f2, and the focal length of the fifth lens element is f5, the following condition can be satisfied: $0.10<|f5/f2|<5.50$. Therefore, it is favorable for adjusting the absolute value of the ratio of the focal length of the fifth lens element to the focal length of the second lens element so as to balance refractive powers at the front side and the rear side of the optical imaging lens system, thereby correcting spherical aberration of aberrations. Moreover, the following condition can also be satisfied: $0.30<|f5/f2|<2.60$. Moreover, the following condition can also be satisfied: $0.45<|f5/f2|<2.30$.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition can be satisfied: $0.55<T34/(T12+T23+T45)<5.50$. Therefore, it is favorable for adjusting the ratio of the lens interval between the third and fourth lens elements to the sum of lens intervals of all other lens intervals, thereby obtaining a proper balance between reduction in manufacturing error and reduction in temperature effect. Moreover, the following condition can also be satisfied: $0.70<T34/(T12+T23+T45)<4.90$.

When the axial distance between the first lens element and the second lens element is T12, and the axial distance between the fourth lens element and the fifth lens element is T45, the following condition can be satisfied: 0.60<T12/T45<40.0. Therefore, it is favorable for adjusting the ratio of the lens interval between the first and second lens elements to the lens interval between the fourth and fifth lens elements, thereby increasing resolutions on the central and peripheral fields of view. Moreover, the following condition can also be satisfied: 0.60<T12/T45<6.00. Moreover, the following condition can also be satisfied: 0.65<T12/T45<3.00. Moreover, the following condition can also be satisfied: 1.00<T12/T45<5.00.

When the focal length of the optical imaging lens system is f, and a curvature radius of the image-side surface of the fifth lens element is R10, the following condition can be satisfied: 0.20<f/R10. Therefore, it is favorable for adjusting the ratio of the focal length of the optical imaging lens system to the curvature radius of the image-side surface of the fifth lens element so as to reduce manufacturing difficulty of the fifth lens element for increasing manufacturing yield rate. Moreover, the following condition can also be satisfied: 0.30<f/R10<10.0.

When a central thickness of the second lens element is CT2, a central thickness of the third lens element is CT3, the axial distance between the second lens element and the third lens element is T23, and the axial distance between the third lens element and the fourth lens element is T34, the following condition can be satisfied: 0.75<(CT2+T23+CT3)/T34<2.00. Therefore, it is favorable for adjusting the ratio of the distance between the object-side surface of the second lens element and the image-side surface of the third lens element to the lens interval between the third and fourth lens elements, thereby increasing volume usage rate. Moreover, the following condition can also be satisfied: 0.90<(CT2+T23+CT3)/T34<1.40.

When a central thickness of the first lens element is CT1, and the central thickness of the second lens element is CT2, the following condition can be satisfied: 0.30<CT1/CT2<2.20. Therefore, it is favorable for adjusting the ratio of the central thickness of the first lens element to the central thickness of the second lens element so as to obtain a proper balance between manufacturing yield rate and image quality on the central field of view. Moreover, the following condition can also be satisfied: 1.50<CT1/CT2<2.30.

When the central thickness of the first lens element is CT1, and the axial distance between the fourth lens element and the fifth lens element is T45, the following condition can be satisfied: 1.20<CT1/T45<15.00. Therefore, it is favorable for adjusting the ratio of the central thickness of the first lens element to the lens interval between the fourth and fifth lens elements, thereby obtaining a proper balance between assembly difficulty and manufacturing yield rate. Moreover, the following condition can also be satisfied: 1.60<CT1/T45<14.00. Moreover, the following condition can also be satisfied: 2.00<CT1/T45<14.00. Moreover, the following condition can also be satisfied: 2.85<CT1/T45<6.50.

When the central thickness of the third lens element is CT3, and the axial distance between the third lens element and the fourth lens element is T34, the following condition can be satisfied: 0.00<CT3/T34<0.85. Therefore, it is favorable for adjusting the ratio of the central thickness of the third lens element to the lens interval between the third and fourth lens elements, thereby balancing refractive powers at the front side and the rear side of the optical imaging lens system and reducing assembly difficulty. Moreover, the following condition can also be satisfied: 0.20<CT3/T34<0.75.

When the axial distance between the first lens element and the second lens element is T12, and the axial distance between the second lens element and the third lens element is T23, the following condition can be satisfied: 0.35<T12/T23. Therefore, it is favorable for adjusting the lens interval between the first and second lens elements to the lens interval between the second and third lens elements, thereby increasing the field of view. Moreover, the following condition can also be satisfied: 0.38<T12/T23<2.20. Moreover, the following condition can also be satisfied: 0.45<T12/T23<2.50.

When the axial distance between the second lens element and the third lens element is T23, and the axial distance between the third lens element and the fourth lens element is T34, the following condition can be satisfied: 1.80<T34/T23<30.00. Therefore, it is favorable for adjusting the lens interval between the third and fourth lens elements to the lens interval between the second and third lens elements so as to adjust the lens distribution, thereby adjusting the overall size distribution of the optical imaging lens system.

When an axial distance between the object-side surface of the first lens element and the image-side surface of the fifth lens element is TD, and an axial distance between the image-side surface of the fifth lens element and the image surface is BL, the following condition can be satisfied: 1.30<TD/BL<3.00. Therefore, it is favorable for adjusting the distance between the object-side surface of the first lens element and the image-side surface of the fifth lens element to the back focal length, thereby obtaining a proper balance between assembly difficulty and reduction in stray light inside lens elements.

When a curvature radius of the object-side surface of the fourth lens element is R7, and the curvature radius of the image-side surface of the fifth lens element is R10, the following condition can be satisfied: 0.85<(R7+R10)/(R7−R10). Therefore, it is favorable for adjusting lens shapes and refractive powers of the fourth and fifth lens elements so as to correct chromatic aberration on overall fields of view. Moreover, the following condition can also be satisfied: 0.90<(R7+R10)/(R7−R10)<30.00.

When an Abbe number of the fourth lens element is V4, the following condition can be satisfied: 12.0<V4<35.0. Therefore, it is favorable for adjusting the Abbe number of the fourth lens element so as to obtain a proper balance between correction in chromatic aberration of aberrations and the back focal length.

When a curvature radius of the object-side surface of the fifth lens element is R9, and the curvature radius of the image-side surface of the fifth lens element is R10, the following condition can be satisfied: 6.60<(R9+R10)/(R9−R10). Therefore, it is favorable for adjusting the lens shape and the refractive power of the fifth lens element so as to reduce the back focal length. Moreover, the following condition can also be satisfied: 8.00<(R9+R10)/(R9−R10). Moreover, the following condition can also be satisfied: 8.00<(R9+R10)/(R9−R10)<70.0.

When the focal length of the optical imaging lens system is f, and a curvature radius of the image-side surface of the first lens element is R2, the following condition can be satisfied: 0.30<f/R2<1.20. Therefore, it is favorable for adjusting the ratio of the overall focal length to the curvature radius of the image-side surface of the first lens element, thereby reducing the overall size and correcting aberrations. Moreover, the following condition can also be satisfied: 0.50<f/R2<1.20.

When a sum of axial distances between each of all adjacent lens elements of the optical imaging lens system is ΣAT, and the axial distance between the object-side surface of the first lens element and the image-side surface of the fifth lens element is TD, the following condition can be satisfied: $0.30<\Sigma AT/TD<0.50$. Therefore, it is favorable for adjusting the ratio of the sum of all lens intervals of the optical imaging lens system to the distance between the object-side surface of the first lens element and the image-side surface of the fifth lens element, thereby obtaining a proper balance between volume usage rate and manufacturing difficulty of the optical imaging lens system.

When a composite focal length of the first lens element and the second lens element is f12, and a composite focal length of the fourth lens element and the fifth lens element is f45, the following condition can be satisfied: $-0.50<f12/f45$. Therefore, it is favorable for adjusting the ratio of the overall refractive power of the first through second lens elements to the overall refractive power of the fourth through fifth lens elements, thereby reducing eccentric sensitivity. Moreover, the following condition can also be satisfied: $-0.45<f12/f45<3.00$. Moreover, the following condition can also be satisfied: $-0.80<f12/f45<0.60$.

When an Abbe number of the second lens element is V2, and the Abbe number of the fourth lens element is V4, the following condition can be satisfied: $30.0<V2+V4<65.0$. Therefore, it is favorable for adjusting the sum of Abbe numbers of the second and fourth lens elements so as to obtain a proper balance between reduction in temperature effect and correction of chromatic aberration.

When the focal length of the optical imaging lens system is f, and the focal length of the second lens element is f2, the following condition can be satisfied: $-0.90<f/f2<-0.10$. Therefore, it is favorable for adjusting the refractive power of the second lens element so as to reduce the spot size on the central field of view.

When the focal length of the optical imaging lens system is f, and a focal length of the first lens element is f1, the following condition can be satisfied: $0.00<f/f1<1.10$. Therefore, it is favorable for adjusting the refractive power of the first lens element so as to reduce spherical aberration of aberrations. Moreover, the following condition can also be satisfied: $0.20<f/f1<1.05$.

When a curvature radius of the object-side surface of the first lens element is R1, and the curvature radius of the image-side surface of the third lens element is R6, the following condition can be satisfied: $-1.00<(R1+R6)/(R1-R6)<5.00$. Therefore, it is favorable for adjusting lens shapes and refractive powers of the first and third lens elements so as to obtain a proper balance between the total track length and light convergence quality of the optical imaging lens system.

When a curvature radius of the image-side surface of the fourth lens element is R8, and the curvature radius of the object-side surface of the fifth lens element is R9, the following condition can be satisfied: $0.90<R8/R9$. Therefore, it is favorable for adjusting the ratio of the curvature radius of the image-side surface of the fourth lens element to the curvature radius of the object-side surface of the fifth lens element, thereby correcting astigmatism of aberrations on the peripheral field of view. Moreover, the following condition can also be satisfied: $1.30<R8/R9<80.00$. Moreover, the following condition can also be satisfied: $2.10<R8/R9<50.00$.

When the focal length of the optical imaging lens system is f, and a focal length of the third lens element is f3, the following condition can be satisfied: $0.05<f/f3<1.30$. Therefore, it is favorable for adjusting the refractive power of the third lens element so as to increase the image height.

When an Abbe number of the third lens element is V3, the following condition can be satisfied: $30.0<V3<70.0$. Therefore, it is favorable for adjusting the Abbe number of the third lens element so as to obtain a proper balance between increase in image height and correction of chromatic aberration. Moreover, the following condition can also be satisfied: $40.0<V3<70.0$.

When the curvature radius of the object-side surface of the first lens element is R1, and the curvature radius of the image-side surface of the first lens element is R2, the following condition can be satisfied: $-3.00<(R1+R2)/(R1-R2)<-0.50$. Therefore, it is favorable for adjusting the lens shape and the refractive power of the first lens element so as to receive light at a relatively large field of view.

When the Abbe number of the second lens element is V2, the following condition can be satisfied: $12.0<V2<35.0$. Therefore, it is favorable for adjusting the Abbe number of the second lens element so as to correct chromatic aberration on the central field of view.

When the focal length of the optical imaging lens system is f, and the curvature radius of the image-side surface of the fourth lens element is R8, the following condition can be satisfied: $0.50<f/R8<4.00$. Therefore, it is favorable for adjusting the ratio of the overall focal length to the curvature radius of the image-side surface of the fourth lens element so as to obtain a proper balance between reduction in the back focal length and increase in resolution.

When the curvature radius of the object-side surface of the first lens element is R1, and a curvature radius of the image-side surface of the second lens element is R4, the following condition can be satisfied: $-3.20<(R1+R4)/(R1-R4)<-1.20$. Therefore, it is favorable for adjusting lens shapes and refractive powers of the first and second lens elements so as to reduce the effective radius of the second lens element, thereby reducing the overall size.

According to the present disclosure, the aforementioned features and conditions can be utilized in numerous combinations so as to achieve corresponding effects.

According to the present disclosure, the lens elements of the optical imaging lens system can be made of either glass or plastic material. When the lens elements are made of glass material, the refractive power distribution of the optical imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens system, based on the corresponding image sensor, can be flat or curved, especially a curved surface being concave facing towards the object side of the optical imaging lens system.

According to the present disclosure, an image correction unit, such as a field flattener, can be optionally disposed between the lens element closest to the image side of the optical imaging lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 22:
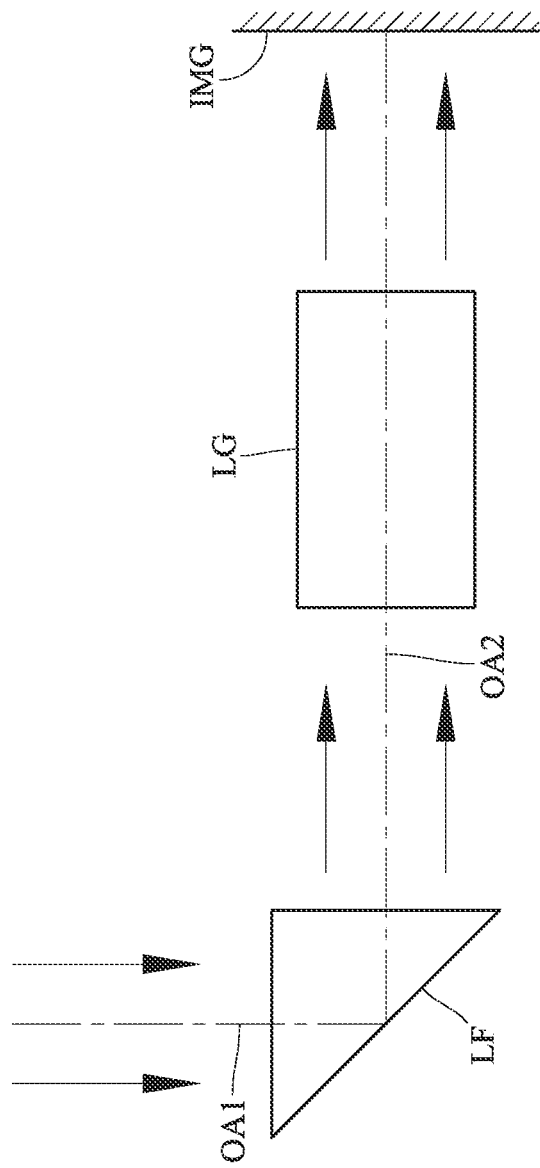
FIG. 22 shows a schematic view of a configuration of a light-folding element in an optical imaging lens system according to one embodiment of the present disclosure.
Figure 23:
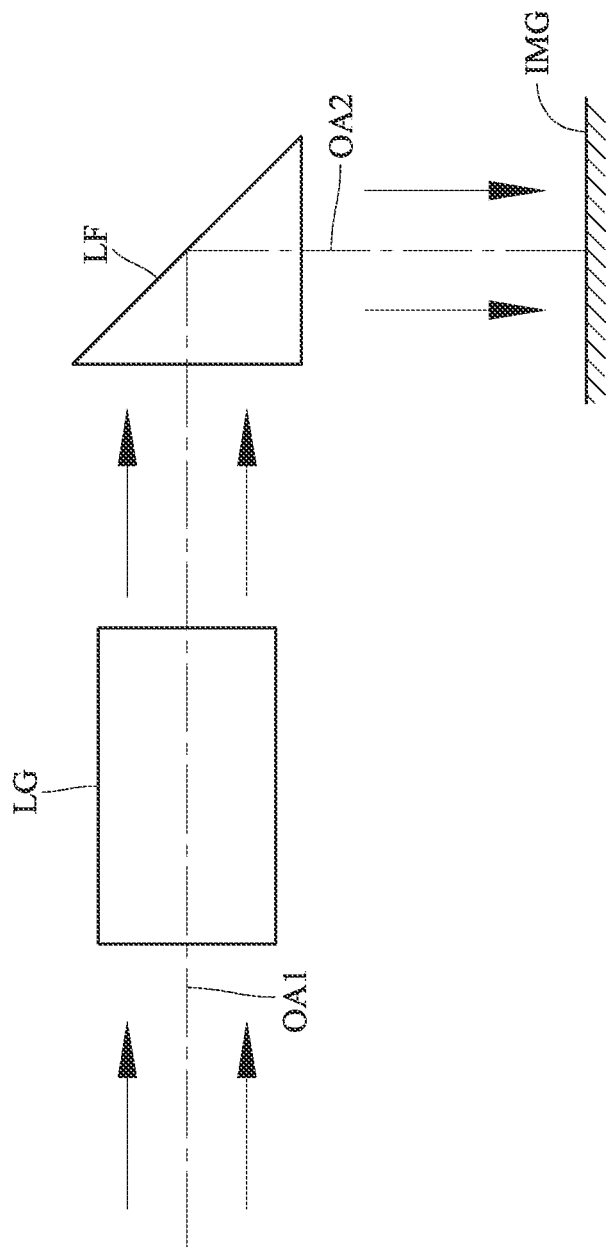
FIG. 23 shows a schematic view of another configuration of a light-folding element in an optical imaging lens system according to one embodiment of the present disclosure.
Figure 24:
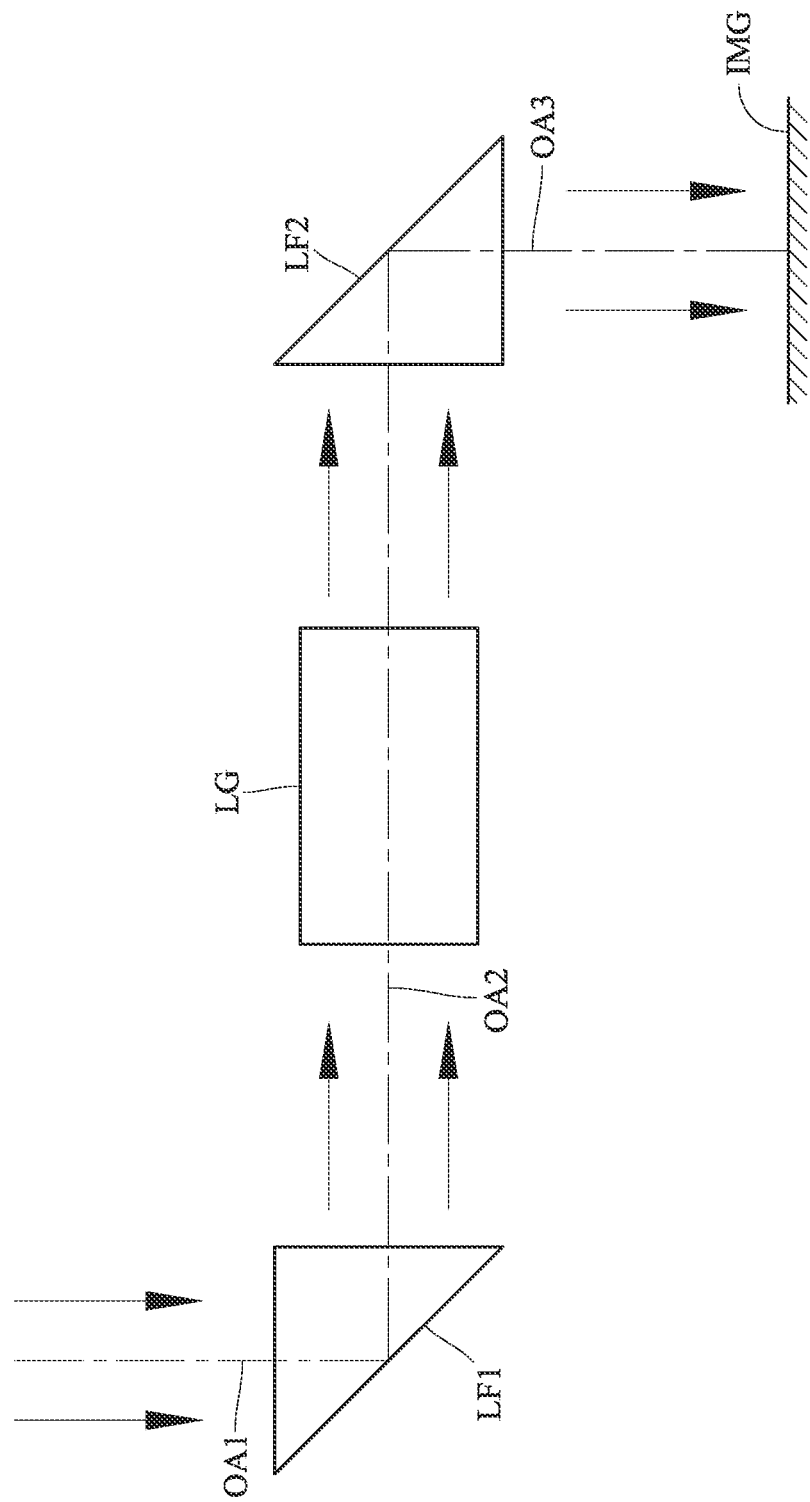
FIG. 24 shows a schematic view of a configuration of two light-folding elements in an optical imaging lens system according to one embodiment of the present disclosure.

According to the present disclosure, at least one light-folding element, such as a prism or a mirror, can be optionally disposed between an imaged object and the image surface on the imaging optical path, such that the optical imaging lens system can be more flexible in space arrangement, and therefore the dimensions of an electronic device is not restricted by the total track length of the optical imaging lens system. Specifically, please refer to FIG. 22 and FIG. 23. FIG. 22 shows a schematic view of a configuration of a light-folding element in an optical imaging lens system according to one embodiment of the present disclosure, and FIG. 23 shows a schematic view of another configuration of a light-folding element in an optical imaging lens system according to one embodiment of the present disclosure. In FIG. 22 and FIG. 23, the optical imaging lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical imaging lens system as shown in FIG. 22 or disposed between a lens group LG of the optical imaging lens system and the image surface IMG as shown in FIG. 23. Furthermore, please refer to FIG. 24, which shows a schematic view of a configuration of two light-folding elements in an optical imaging lens system according to one embodiment of the present disclosure. In FIG. 24, the optical imaging lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens system, the second light-folding element LF2 is disposed between the lens group LG of the optical imaging lens system and the image surface IMG, and the travelling direction of light on the first optical axis OA1 can be the same direction as the travelling direction of light on the third optical axis OA3 as shown in FIG. 24. The optical imaging lens system can be optionally provided with three or more light-folding elements, and the present disclosure is not limited to the type, amount and position of the light-folding elements of the embodiments disclosed in the aforementioned figures.

According to the present disclosure, the optical imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens system and thereby provides a wider field of view for the same.

According to the present disclosure, the optical imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical imaging lens system can include one or more optical elements for limiting the form of light passing through the optical imaging lens system. Each optical element can be, but not limited to, a filter, a polarizer, etc., and each optical element can be, but not limited to, a single-piece element, a composite component, a thin film, etc. The optical element can be located at the object side or the image side of the optical imaging lens system or between any two adjacent lens elements so as to allow light in a specific form to pass through, thereby meeting application requirements.

According to the above description of the present disclosure, the following specific embodiments are provided for further explanation.

1st Embodiment

Figure 1:
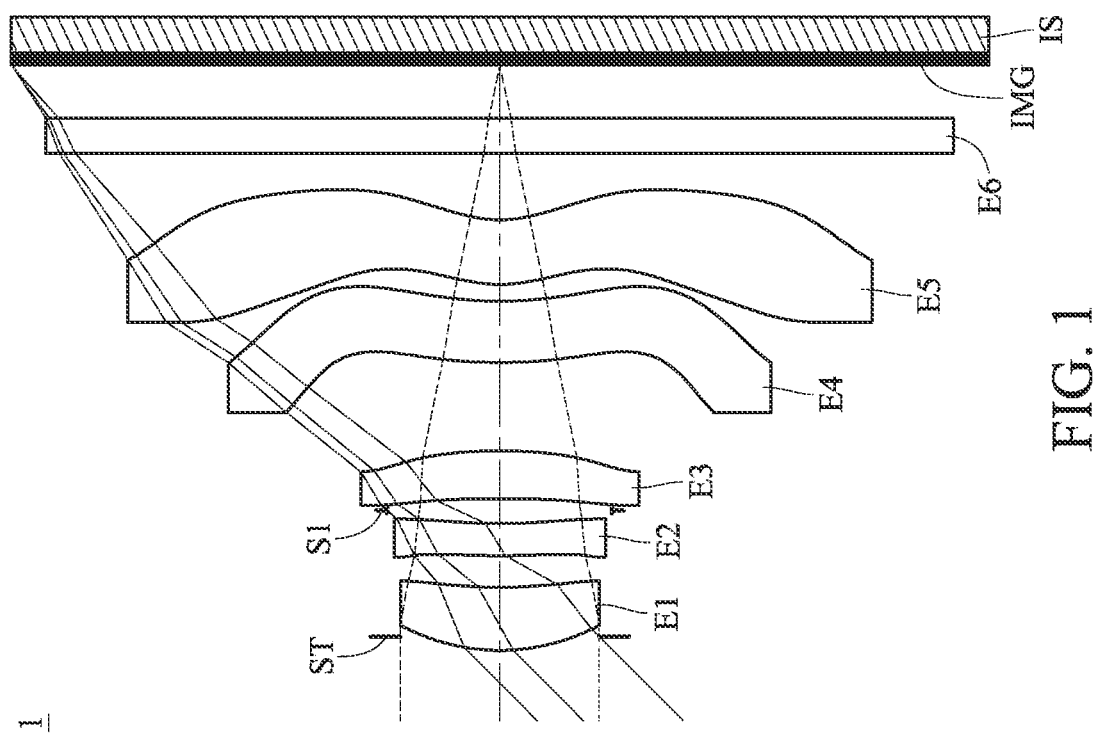
FIG. 1 is a schematic view of an image capturing unit according to the 1st embodiment of the present disclosure.
Figure 2:
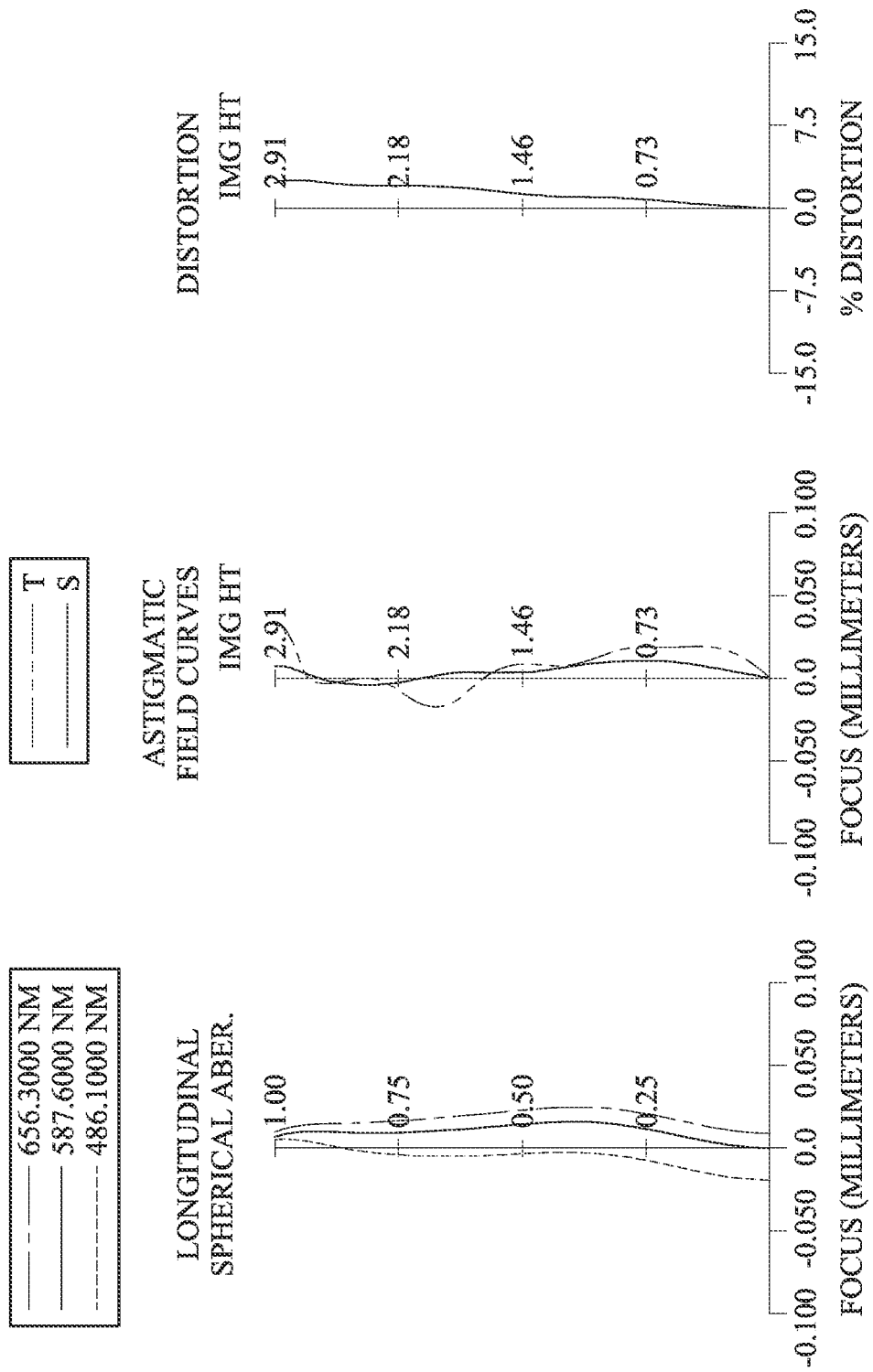
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The object-side surface of the second lens element E2 has one critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26 and 28.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=2.85 millimeters (mm), Fno=2.41, HFOV=44.9 degrees (deg.).

When a central thickness of the second lens element E2 is CT2, a central thickness of the third lens element E3 is CT3, an axial distance between the second lens element E2 and the third lens element E3 is T23, and an axial distance between the third lens element E3 and the fourth lens element E4 is T34, the following condition is satisfied: (CT2+T23+CT3)/T34=1.19. In this embodiment, an axial distance between two adjacent lens elements is a distance in a paraxial region between two adjacent lens surfaces of the two adjacent lens elements.

When a curvature radius of the object-side surface of the first lens element E1 is R1, and a curvature radius of the image-side surface of the first lens element E1 is R2, the following condition is satisfied: (R1+R2)/(R1−R2)=−2.51.

When the curvature radius of the object-side surface of the first lens element E1 is R1, and a curvature radius of the image-side surface of the second lens element E2 is R4, the following condition is satisfied: (R1+R4)/(R1−R4)=−2.14.

When the curvature radius of the object-side surface of the first lens element E1 is R1, and a curvature radius of the image-side surface of the third lens element E3 is R6, the following condition is satisfied: (R1+R6)/(R1−R6)=−0.44.

When a curvature radius of the object-side surface of the third lens element E3 is R5, and the curvature radius of the image-side surface of the third lens element E3 is R6, the following condition is satisfied: (R5+R6)/(R5−R6)=1.89.

When a curvature radius of the object-side surface of the fourth lens element E4 is R7, and a curvature radius of the image-side surface of the fifth lens element E5 is R10, the following condition is satisfied: (R7+R10)/(R7−R10)=1.55.

When a curvature radius of the object-side surface of the fifth lens element E5 is R9, and the curvature radius of the image-side surface of the fifth lens element E5 is R10, the following condition is satisfied: (R9+R10)/(R9−R10)= 19.17.

When a focal length of the second lens element E2 is f2, and a focal length of the fifth lens element E5 is f5, the following condition is satisfied: |f5/f2|=1.08.

When a central thickness of the first lens element E1 is CT1, and the central thickness of the second lens element E2 is CT2, the following condition is satisfied: CT1/CT2=1.95.

When the central thickness of the first lens element E1 is CT1, and an axial distance between the fourth lens element E4 and the fifth lens element E5 is T45, the following condition is satisfied: CT1/T45=3.76.

When the central thickness of the third lens element E3 is CT3, and the axial distance between the third lens element E3 and the fourth lens element E4 is T34, the following condition is satisfied: CT3/T34=0.54.

When the focal length of the optical imaging lens system is f, and a focal length of the first lens element E1 is f1, the following condition is satisfied: f/f1=0.78.

When the focal length of the optical imaging lens system is f, and the focal length of the second lens element E2 is f2, the following condition is satisfied: f/f2=−0.16.

When the focal length of the optical imaging lens system is f, and a focal length of the third lens element E3 is f3, the following condition is satisfied: f/f3=0.34.

When the focal length of the optical imaging lens system is f, and a focal length of the fourth lens element is f4, the following condition is satisfied: f/f4=−0.31.

When the focal length of the optical imaging lens system is f, and a focal length of the fifth lens element E5 is f5, the following condition is satisfied: f/f5=0.14.

When the focal length of the optical imaging lens system is f, and the curvature radius of the image-side surface of the first lens element E1 is R2, the following condition is satisfied: f/R2=0.99.

When the focal length of the optical imaging lens system is f, and a curvature radius of the image-side surface of the fourth lens element E4 is R8, the following condition is satisfied: f/R8=1.38.

When the focal length of the optical imaging lens system is f, and the curvature radius of the image-side surface of the fifth lens element E5 is R10, the following condition is satisfied: f/R10=3.94.

When a composite focal length of the first lens element E1 and the second lens element E2 is f12, and a composite focal length of the fourth lens element E4 and the fifth lens element E5 is f45, the following condition is satisfied: f12/f45=−0.35.

When the curvature radius of the image-side surface of the fourth lens element E4 is R8, and the curvature radius of the object-side surface of the fifth lens element E5 is R9, the following condition is satisfied: R8/R9=2.58.

When an axial distance between the first lens element E1 and the second lens element E2 is T12, and the axial distance between the second lens element E2 and the third lens element E3 is T23, the following condition is satisfied: T12/T23=1.28.

When the axial distance between the first lens element E1 and the second lens element E2 is T12, and the axial distance between the fourth lens element E4 and the fifth lens element E5 is T45, the following condition is satisfied: T12/T45=1.88.

When the axial distance between the first lens element E1 and the second lens element E2 is T12, the axial distance between the second lens element E2 and the third lens element E3 is T23, the axial distance between the third lens element E3 and the fourth lens element E4 is T34, and the axial distance between the fourth lens element E4 and the fifth lens element E5 is T45, the following condition is satisfied: T34/(T12+T23+T45)=1.21.

When the axial distance between the second lens element E2 and the third lens element E3 is T23, and the axial distance between the third lens element E3 and the fourth lens element E4 is T34, the following condition is satisfied: T34/T23=3.59.

When an axial distance between the object-side surface of the first lens element E1 and the image-side surface of the fifth lens element E5 is TD, and an axial distance between the image-side surface of the fifth lens element E5 and the image surface IMG is BL, the following condition is satisfied: TD/BL=2.78.

When an Abbe number of the second lens element E2 is V2, the following condition is satisfied: V2=19.5.

When the Abbe number of the second lens element E2 is V2, and an Abbe number of the fourth lens element E4 is V4, the following condition is satisfied: V2+V4=38.9.

When an Abbe number of the third lens element E3 is V3, the following condition is satisfied: V3=56.0.

When the Abbe number of the fourth lens element E4 is V4, the following condition is satisfied: V4=19.5.

When a sum of axial distances between each of all adjacent lens elements of the optical imaging lens system is $\Sigma AT$, and the axial distance between the object-side surface of the first lens element E1 and the image-side surface of the fifth lens element E5 is TD, the following condition is satisfied: $\Sigma AT$/TD=0.37. In this embodiment, $\Sigma AT$ is a sum of axial distances between the first lens element E1 and the second lens element E2, the second lens element E2 and the third lens element E3, the third lens element E3 and the fourth lens element E4, and the fourth lens element E4 and the fifth lens element E5.

The detailed optical data of the 1st embodiment are shown in Table 1A and the aspheric surface data are shown in Table 1B below.

TABLE 1A

| 1st Embodiment f = 2.85 mm, Fno = 2.41, HFOV = 44.9 deg. | | | | | | | |
|---|---|---|---|---|---|---|---|
| Surface # | | Curvature Radius | | Thickness | Material Index | Abbe # | Focal Length |
| 0 | Object | Plano | | Infinity | | | |
| 1 | Ape. Stop | Plano | | −0.081 | | | |
| 2 | Lens 1 | 1.2341 | (ASP) | 0.376 | Plastic 1.545 | 56.1 | 3.67 |
| 3 | | 2.8719 | (ASP) | 0.188 | | | |
| 4 | Lens 2 | 4.8212 | (ASP) | 0.193 | Plastic 1.669 | 19.5 | −18.40 |

TABLE 1A-continued

1st Embodiment
f = 2.85 mm, Fno = 2.41, HFOV = 44.9 deg.

| Surface # | | Curvature Radius | | Thickness | Material | Index | Abbe # | Focal Length |
|---|---|---|---|---|---|---|---|---|
| 5 | | 3.4086 | (ASP) | 0.076 | | | | |
| 6 | Stop | Plano | | 0.071 | | | | |
| 7 | Lens 3 | −10.3961 | (ASP) | 0.286 | Plastic | 1.544 | 56.0 | 8.40 |
| 8 | | −3.2055 | (ASP) | 0.527 | | | | |
| 9 | Lens 4 | 3.3501 | (ASP) | 0.366 | Plastic | 1.669 | 19.5 | −9.14 |
| 10 | | 2.0698 | (ASP) | 0.100 | | | | |
| 11 | Lens 5 | 0.8038 | (ASP) | 0.386 | Plastic | 1.534 | 55.9 | 19.95 |
| 12 | | 0.7241 | (ASP) | 0.396 | | | | |
| 13 | Filter | Plano | | 0.210 | Glass | 1.517 | 64.2 | — |
| 14 | | Plano | | 0.319 | | | | |
| 15 | Image | Plano | | — | | | | |

Note:
Reference wavelength is 587.6 nm (d-line).
An effective radius of the stop S1 (Surface 6) is 0.670 mm.

TABLE 1B

Aspheric Coefficients

| Surface # | 2 | 3 | 4 | 5 |
|---|---|---|---|---|
| k= | −6.57873000E−01 | 2.36477000E+00 | 1.84668000E+01 | −8.58406000E+00 |
| A4= | 2.39615091E−02 | −1.14935541E−01 | −3.50145497E−01 | −1.65301969E−01 |
| A6= | 2.20639093E−01 | −4.30876649E−02 | 5.05908865E−01 | −2.62012438E−01 |
| A8= | −1.74895265E+00 | −1.85796914E+00 | −7.70758304E+00 | 2.72832868E+00 |
| A10= | 7.16523999E+00 | 9.34641354E+00 | 4.10568881E+01 | −1.62154825E+01 |
| A12= | −1.64611467E+01 | −2.83395687E+01 | −1.28428909E+02 | 5.14573299E+01 |
| A14= | 1.49164636E+01 | 3.44700822E+01 | 2.13812038E+02 | −7.95051305E+01 |
| A16= | — | — | −1.31317031E+02 | 5.06805407E+01 |

| Surface # | 7 | 8 | 9 | 10 |
|---|---|---|---|---|
| k= | −1.46640000E+01 | −3.19553000E+00 | −4.54566000E+01 | −3.12110000E+01 |
| A4= | −1.26949871E−01 | −1.18356934E−01 | 4.26277944E−01 | 9.33247289E−02 |
| A6= | −7.28336704E−01 | −1.20017457E+00 | −1.79234723E+00 | −4.67403683E−02 |
| A8= | 6.58592176E+00 | 6.95614663E+00 | 4.47245703E+00 | −5.58798456E−01 |
| A10= | −2.76093108E+01 | −2.07427786E+01 | −8.96416707E+00 | 1.01653560E+00 |
| A12= | 7.23557360E+01 | 3.71352450E+01 | 1.25186484E+01 | −9.94671428E−01 |
| A14= | −1.08048852E+02 | −3.44552649E+01 | −1.17430638E+01 | 6.72451214E−01 |
| A16= | 8.27678942E+01 | 1.33163526E+01 | 7.13713286E+00 | −3.32557464E−01 |
| A18= | −2.58339836E+01 | −8.11913527E−01 | −2.65348900E+00 | 1.16893949E−01 |
| A20= | — | — | 5.43365352E−01 | −2.69306385E−02 |
| A22= | — | — | −4.67164247E−02 | 3.56468255E−03 |
| A24= | — | — | — | −2.02783365E−04 |

| Surface # | 11 | 12 |
|---|---|---|
| k= | −4.78551000E+00 | −3.47768000E+00 |
| A4= | −8.25906943E−01 | −6.00503859E−01 |
| A6= | 1.28900872E+00 | 9.76510918E−01 |
| A8= | −2.02188730E+00 | −1.40085056E+00 |
| A10= | 2.50499178E+00 | 1.50229176E+00 |
| A12= | −2.08252400E+00 | −1.11496225E+00 |
| A14= | 1.15267640E+00 | 5.74914431E−01 |
| A16= | −4.32473213E−01 | −2.09444545E−01 |
| A18= | 1.10800448E−01 | 5.43652024E−02 |
| A20= | −1.91415605E−02 | −1.00055292E−02 |
| A22= | 2.13678483E−03 | 1.27678644E−03 |
| A24= | −1.39378432E−04 | −1.07476102E−04 |
| A26= | 4.03887897E−06 | 5.36747341E−06 |
| A28= | — | −1.20407369E−07 |

In Table 1A, the curvature radius, the thickness and the focal length are shown in millimeters (mm). Surface numbers 0-15 represent the surfaces sequentially arranged from the object side to the image side along the optical axis. In Table 1B, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
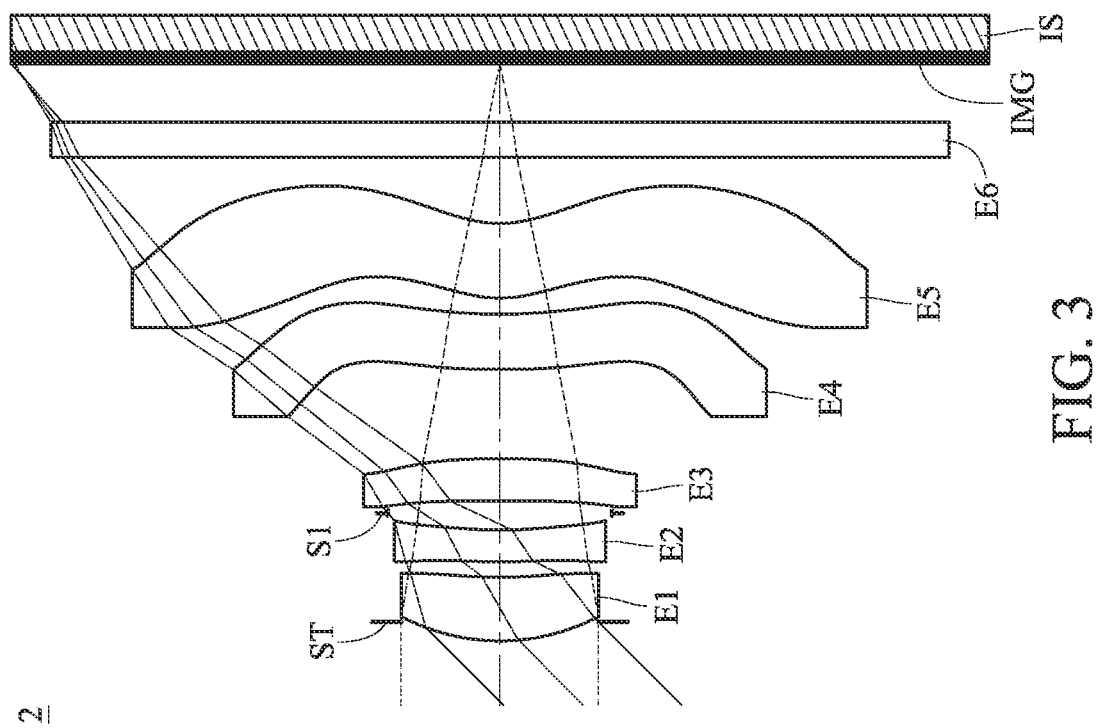
FIG. 3 is a schematic view of an image capturing unit according to the 2nd embodiment of the present disclosure.
Figure 4:
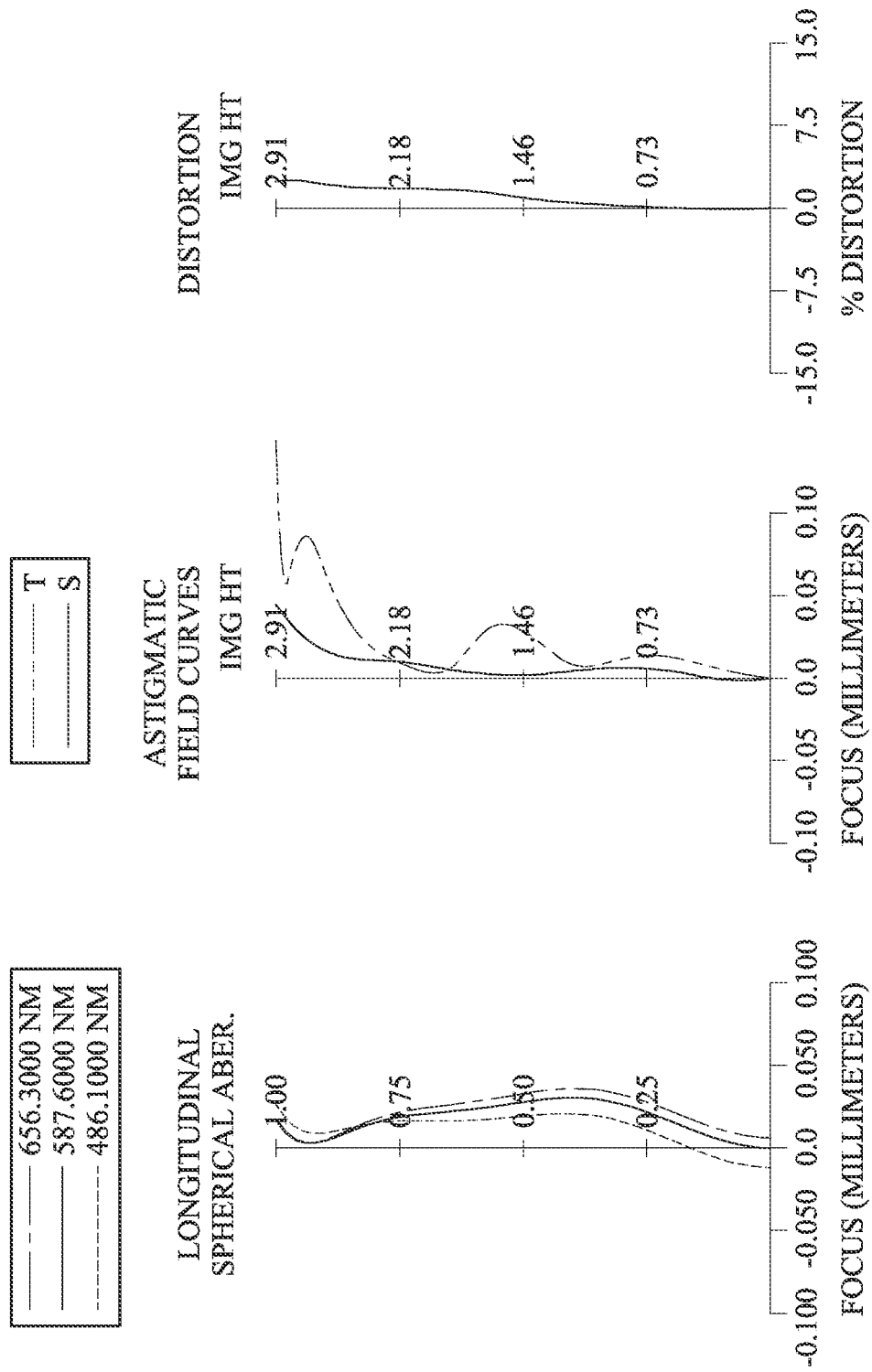
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The object-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point. The object-side surface of the third lens element E3 has one critical point in an off-axis region thereof. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The detailed optical data of the 2nd embodiment are shown in Table 2A and the aspheric surface data are shown in Table 2B below.

TABLE 2A

2nd Embodiment
f = 2.83 mm, Fno = 2.40, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.114 | | | | |
| 2 | Lens 1 | 1.2359 | (ASP) | 0.383 | Plastic | 1.545 | 56.1 | 3.53 |
| 3 | | 3.0753 | (ASP) | 0.092 | | | | |
| 4 | Lens 2 | 4.1601 | (ASP) | 0.190 | Plastic | 1.669 | 19.5 | −13.41 |
| 5 | | 2.7901 | (ASP) | 0.101 | | | | |
| 6 | Stop | Plano | | 0.072 | | | | |
| 7 | Lens 3 | 374.8768 | (ASP) | 0.255 | Plastic | 1.544 | 56.0 | 8.25 |
| 8 | | −4.5393 | (ASP) | 0.534 | | | | |
| 9 | Lens 4 | 8.9767 | (ASP) | 0.330 | Plastic | 1.669 | 19.5 | −5.72 |
| 10 | | 2.6431 | (ASP) | 0.097 | | | | |
| 11 | Lens 5 | 0.7105 | (ASP) | 0.447 | Plastic | 1.534 | 55.9 | 7.04 |
| 12 | | 0.6843 | (ASP) | 0.396 | | | | |

TABLE 2A-continued

2nd Embodiment
f = 2.83 mm, Fno = 2.40, HFOV = 44.9 deg.

| Surface # | | Curvature Radius | Thickness | Material | Index | Abbe # | Focal Length |
|---|---|---|---|---|---|---|---|
| 13 | Filter | Plano | 0.210 | Glass | 1.517 | 64.2 | — |
| 14 | | Plano | 0.352 | | | | |
| 15 | Image | Plano | — | | | | |

Note:
Reference wavelength is 587.6 nm (d-line).
An effective radius of the stop S1 (Surface 6) is 0.670 mm.

TABLE 2B

| Aspheric Coefficients | | | | |
|---|---|---|---|---|
| Surface # | 2 | 3 | 4 | 5 |
| k= | −7.86352000E−01 | −1.23853000E+01 | 1.37504000E+01 | −2.98760000E+00 |
| A4= | 9.72358347E−03 | −1.93354403E−01 | −5.43876321E−01 | −2.74905766E−01 |
| A6= | 2.99749527E−01 | −8.38805570E−01 | 8.01430870E−01 | 2.28570743E−01 |
| A8= | −1.63459323E+00 | 6.54569973E+00 | −4.62577299E+00 | 1.66807496E+00 |
| A10= | 3.65548863E+00 | −3.26796175E+01 | 2.18109889E+01 | −5.62363823E+00 |
| A12= | −3.69342987E+00 | 7.61084436E+01 | −6.61232543E+01 | 8.96040101E+00 |
| A14= | — | −5.97869059E+01 | 1.37970608E+02 | −4.38068376E+00 |
| A16= | — | — | −1.15192637E+02 | — |

| Surface # | 7 | 8 | 9 | 10 |
|---|---|---|---|---|
| k= | −9.00000000E+01 | −9.72661000E+00 | −7.15501000E+01 | −7.33117000E+01 |
| A4= | −1.11628353E−01 | −5.16209180E−03 | 5.41803810E−01 | −9.28261798E−02 |
| A6= | −1.58384666E+00 | −2.02112953E+00 | −2.16892036E+00 | 1.45727782E+00 |
| A8= | 1.18615730E+01 | 1.14763018E+01 | 5.97119563E+00 | −5.14246990E+00 |
| A10= | −4.50363462E+01 | −3.79876262E+01 | −1.37311070E+01 | 8.91847473E+00 |
| A12= | 9.88784240E+01 | 7.98762048E+01 | 2.19745562E+01 | −9.57654194E+00 |
| A14= | −1.13443523E+02 | −9.95718766E+01 | −2.29243631E+01 | 6.85324213E+00 |
| A16= | 4.99911592E+01 | 6.71778854E+01 | 1.51150503E+01 | −3.34113607E+00 |
| A18= | — | −1.89038614E+01 | −6.08792725E+00 | 1.09776789E+00 |
| A20= | — | — | 1.40222443E+00 | −2.32204932E−01 |
| A22= | — | — | −1.58313312E−01 | 2.84671652E−02 |
| A24= | — | — | 5.47083117E−03 | −1.53189207E−03 |

| Surface # | 11 | 12 |
|---|---|---|
| k= | −3.69474000E+00 | −2.67756000E+00 |
| A4= | −1.05106108E+00 | −7.56075770E−01 |
| A6= | 2.54462912E+00 | 1.48492816E+00 |
| A8= | −4.57066133E+00 | −2.23919253E+00 |
| A10= | 5.27830277E+00 | 2.39057992E+00 |
| A12= | −3.98029062E+00 | −1.79920961E+00 |
| A14= | 2.03551533E+00 | 9.67453730E−01 |
| A16= | −7.22661913E−01 | −3.75355724E−01 |
| A18= | 1.78995144E−01 | 1.05188332E−01 |
| A20= | −3.04389376E−02 | −2.10703068E−02 |
| A22= | 3.39473589E−03 | 2.93823411E−03 |
| A24= | −2.23886412E−04 | −2.70569679E−04 |
| A26= | 6.62118525E−06 | 1.47667494E−05 |
| A28= | — | −3.61146845E−07 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Schematic Parameters

| | | | |
|---|---|---|---|
| f [mm] | 2.83 | f/f4 | −0.50 |
| Fno | 2.40 | f/f5 | 0.40 |
| HFOV [deg.] | 44.9 | f/R2 | 0.92 |
| (CT2 + T23 + CT3)/T34 | 1.16 | f/R8 | 1.07 |
| (R1 + R2)/(R1 − R2) | −2.34 | f/R10 | 4.14 |
| (R1 + R4)/(R1 − R4) | −2.59 | f12/f45 | −0.32 |
| (R1 + R6)/(R1 − R6) | −0.57 | R8/R9 | 3.72 |
| (R5 + R6)/(R5 − R6) | 0.98 | T12/T23 | 0.53 |
| (R7 + R10)/(R7 − R10) | 1.17 | T12/T45 | 0.95 |
| (R9 + R10)/(R9 − R10) | 53.36 | T34/(T12 + T23 + T45) | 1.48 |
| \|f5/f2\| | 0.52 | T34/T23 | 3.09 |
| CT1/CT2 | 2.02 | TD/BL | 2.61 |
| CT1/T45 | 3.95 | V2 | 19.5 |
| CT3/T34 | 0.48 | V2 + V4 | 38.9 |
| f/f1 | 0.80 | V3 | 56.0 |
| f/f2 | −0.21 | V4 | 19.5 |
| f/f3 | 0.34 | ΣAT/TD | 0.36 |

3rd Embodiment

Figure 5:
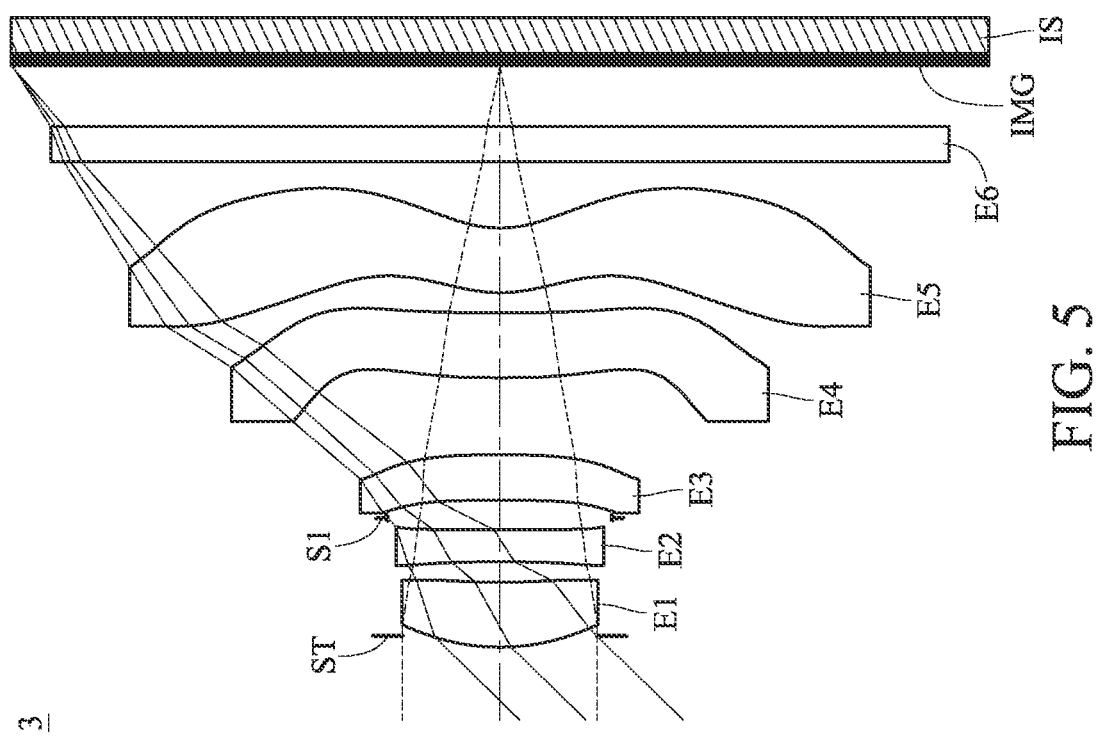
FIG. 5 is a schematic view of an image capturing unit according to the 3rd embodiment of the present disclosure.
Figure 6:
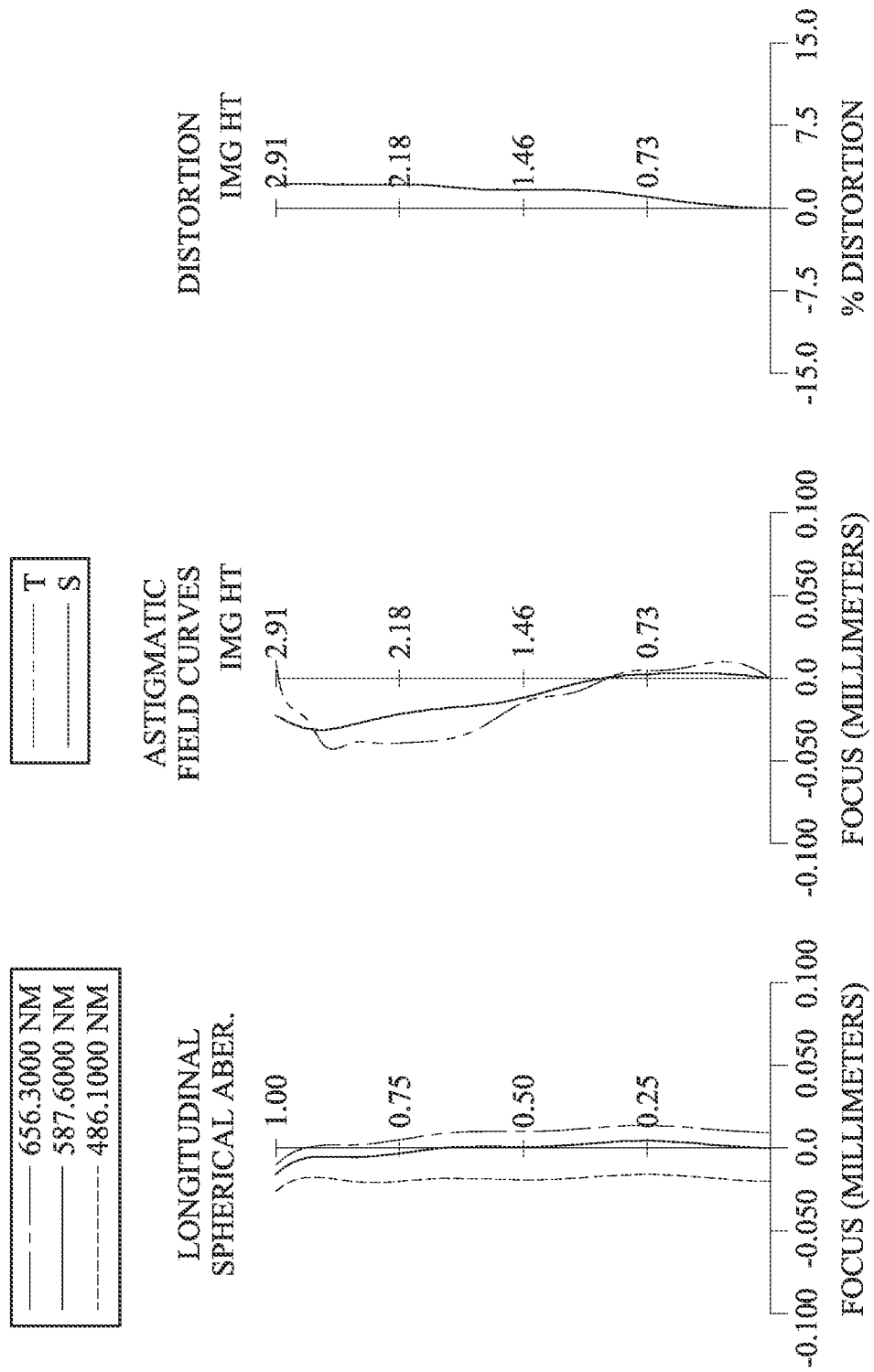
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The detailed optical data of the 3rd embodiment are shown in Table 3A and the aspheric surface data are shown in Table 3B below.

TABLE 3A

3rd Embodiment
f = 2.80 mm, Fno = 2.41, HFOV = 45.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.066 | | | | |
| 2 | Lens 1 | 1.2727 | (ASP) | 0.388 | Plastic | 1.545 | 56.1 | 3.11 |
| 3 | | 4.5425 | (ASP) | 0.122 | | | | |
| 4 | Lens 2 | −11.6050 | (ASP) | 0.190 | Plastic | 1.660 | 20.4 | −12.99 |
| 5 | | 33.0453 | (ASP) | 0.072 | | | | |

TABLE 3A-continued

3rd Embodiment
f = 2.80 mm, Fno = 2.41, HFOV = 45.6 deg.

| Surface # | | Curvature Radius | | Thickness | Material | Index | Abbe # | Focal Length |
|---|---|---|---|---|---|---|---|---|
| 6 | Stop | Plano | | 0.105 | | | | |
| 7 | Lens 3 | −36.3099 | (ASP) | 0.272 | Plastic | 1.544 | 56.0 | 20.43 |
| 8 | | −8.5317 | (ASP) | 0.460 | | | | |
| 9 | Lens 4 | 7.4655 | (ASP) | 0.387 | Plastic | 1.660 | 20.4 | 38.19 |
| 10 | | 10.3893 | (ASP) | 0.121 | | | | |
| 11 | Lens 5 | 0.8209 | (ASP) | 0.386 | Plastic | 1.544 | 56.0 | −25.20 |
| 12 | | 0.6462 | (ASP) | 0.396 | | | | |
| 13 | Filter | Plano | | 0.210 | Glass | 1.517 | 64.2 | — |
| 14 | | Plano | | 0.366 | | | | |
| 15 | Image | Plano | | — | | | | |

Note:
Reference wavelength is 587.6 nm (d-line).
An effective radius of the stop S1 (Surface 6) is 0.670 mm.

TABLE 3B

Aspheric Coefficients

| Surface # | 2 | 3 | 4 | 5 |
|---|---|---|---|---|
| k= | −9.82627000E−01 | −2.56935000E+01 | −9.00000000E+01 | 9.00000000E+01 |
| A4= | 2.34176746E−02 | −1.07862403E−01 | −1.73014438E−01 | −7.04788040E−02 |
| A6= | 1.95854282E−01 | −2.45318200E−01 | 1.77741055E+00 | 7.66178837E−01 |
| A8= | −1.60143132E+00 | −1.62118284E+00 | −2.82995171E+01 | −4.35971428E+00 |
| A10= | 5.51953770E+00 | −1.53138500E+00 | 2.51890250E+02 | 2.26733351E+01 |
| A12= | −1.30851087E+01 | 3.19738841E+00 | −1.34056037E+03 | −6.70072779E+01 |
| A14= | 1.30206497E+01 | 5.73532842E+00 | 4.35338416E+03 | 1.05250350E+02 |
| A16= | — | — | −8.38714906E+03 | −6.39863303E+01 |
| A18= | — | — | 8.87606069E+03 | — |
| A20= | — | — | −3.99580389E+03 | — |

| Surface # | 7 | 8 | 9 | 10 |
|---|---|---|---|---|
| k= | −9.00000000E+01 | 6.20390000E+01 | −1.92842000E+01 | 4.10365000E+00 |
| A4= | −2.71562261E−01 | −1.92144676E−01 | 3.87530120E−01 | −1.50979405E−01 |
| A6= | −1.03831970E+00 | −1.10133825E+00 | −1.52075698E+00 | 9.91100679E−01 |
| A8= | 1.00547699E+01 | 6.26404191E+00 | 4.30667452E+00 | −2.56045910E+00 |
| A10= | −5.17741660E+01 | −2.19432428E+01 | −9.99616568E+00 | 3.54034177E+00 |
| A12= | 1.59081055E+02 | 4.97227406E+01 | 1.56631676E+01 | −3.15422307E+00 |
| A14= | −2.91141306E+02 | −6.98181995E+01 | −1.60779859E+01 | 1.89775953E+00 |
| A16= | 2.91554164E+02 | 5.56056570E+01 | 1.04520012E+01 | −7.77141904E−01 |
| A18= | −1.18667240E+02 | −1.84983029E+01 | −4.08076193E+00 | 2.14035240E−01 |
| A20= | — | — | 8.65968155E−01 | −3.80618190E−02 |
| A22= | — | — | −7.64436867E−02 | 3.95331434E−03 |
| A24= | — | — | — | −1.81973916E−04 |

| Surface # | 11 | 12 |
|---|---|---|
| k= | −4.27242000E+00 | −3.03518000E+00 |
| A4= | −7.80211678E−01 | −5.36268380E−01 |
| A6= | 1.10740781E+00 | 7.80701571E−01 |
| A8= | −1.51232066E+00 | −9.97113546E−01 |
| A10= | 1.68361209E+00 | 1.01800951E+00 |
| A12= | −1.30153570E+00 | −7.92217035E−01 |
| A14= | 6.84368642E−01 | 4.59941388E−01 |
| A16= | −2.47600828E−01 | −1.95832484E−01 |
| A18= | 6.19217982E−02 | 6.01639620E−02 |
| A20= | −1.05554534E−02 | −1.30833462E−02 |
| A22= | 1.17405083E−03 | 1.95483351E−03 |
| A24= | −7.69642584E−05 | −1.90271677E−04 |
| A26= | 2.25770976E−06 | 1.08379644E−05 |
| A28= | — | −2.73562329E−07 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Schematic Parameters

| | | | |
|---|---|---|---|
| f [mm] | 2.80 | f/f4 | 0.07 |
| Fno | 2.41 | f/f5 | −0.11 |
| HFOV [deg.] | 45.6 | f/R2 | 0.62 |
| (CT2 + T23 + CT3)/T34 | 1.39 | f/R8 | 0.27 |
| (R1 + R2)/(R1 − R2) | −1.78 | f/R10 | 4.33 |
| (R1 + R4)/(R1 − R4) | −1.08 | f12/f45 | −0.03 |
| (R1 + R6)/(R1 − R6) | −0.74 | R8/R9 | 12.66 |
| (R5 + R6)/(R5 − R6) | 1.61 | T12/T23 | 0.69 |
| (R7 + R10)/(R7 − R10) | 1.19 | T12/T45 | 1.01 |
| (R9 + R10)/(R9 − R10) | 8.40 | T34/(T12 + T23 + T45) | 1.10 |
| \|f5/f2\| | 1.94 | T34/T23 | 2.60 |
| CT1/CT2 | 2.04 | TD/BL | 2.58 |
| CT1/T45 | 3.21 | V2 | 20.4 |
| CT3/T34 | 0.59 | V2 + V4 | 40.8 |
| f/f1 | 0.90 | V3 | 56.0 |
| f/f2 | −0.22 | V4 | 20.4 |
| f/f3 | 0.14 | ΣAT/TD | 0.35 |

4th Embodiment

Figure 7:
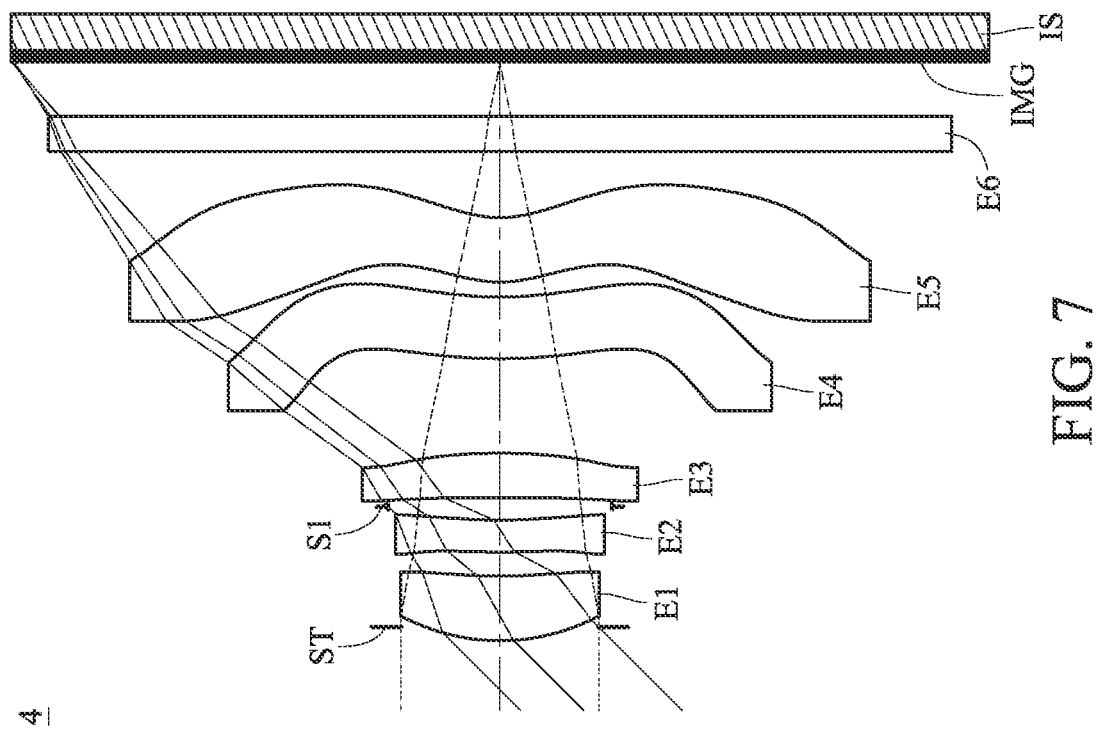
FIG. 7 is a schematic view of an image capturing unit according to the 4th embodiment of the present disclosure.
Figure 8:
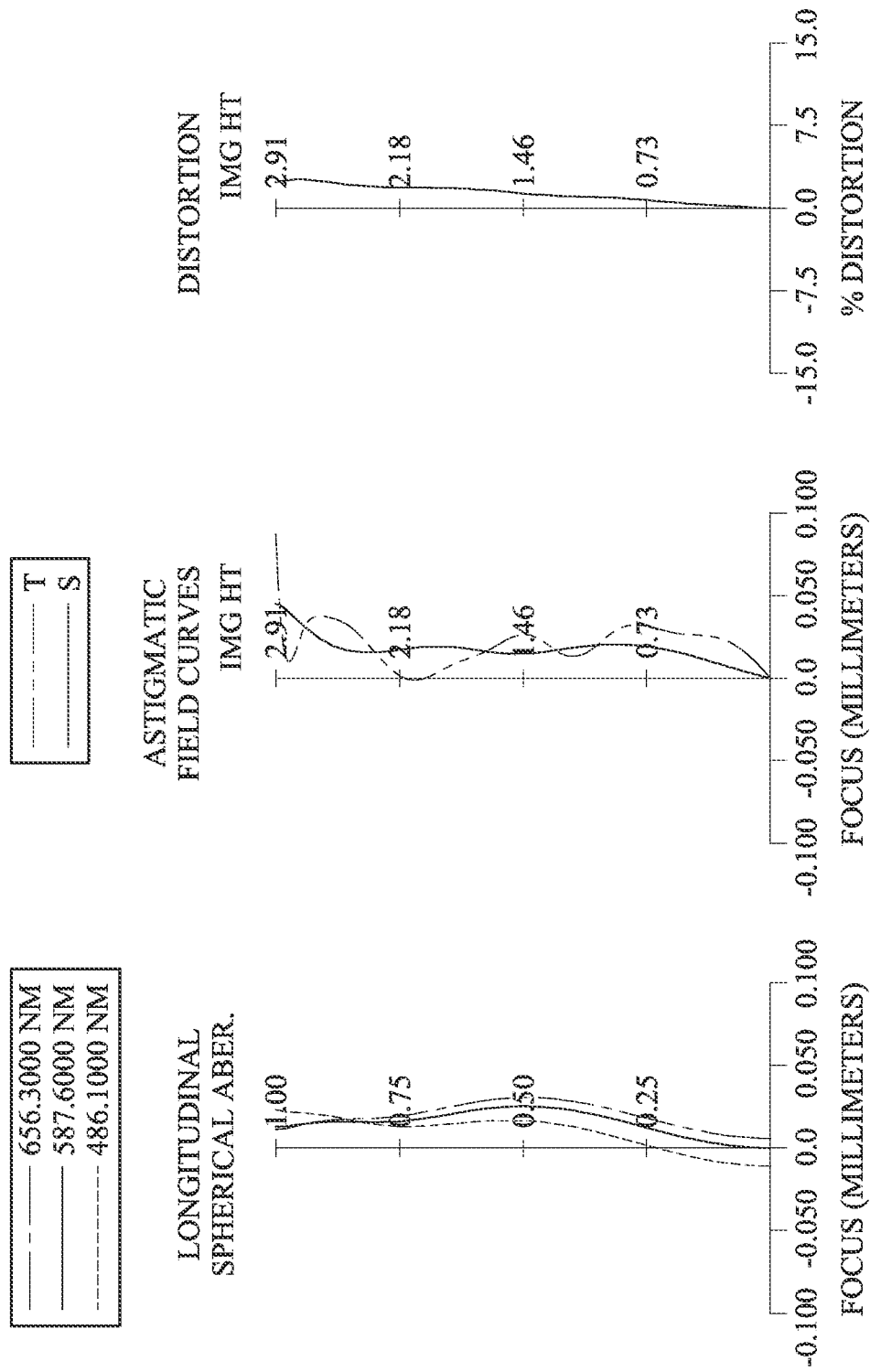
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has two inflection points. The object-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has three inflection points. The image-side surface of the third lens element E3 has one inflection point. The object-side surface of the third lens element E3 has one critical point in an off-axis region thereof. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The detailed optical data of the 4th embodiment are shown in Table 4A and the aspheric surface data are shown in Table 4B below.

TABLE 4A

4th Embodiment
f = 2.84 mm, Fno = 2.40, HFOV = 44.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.083 | | | | |
| 2 | Lens 1 | 1.2293 (ASP) | 0.386 | Plastic | 1.545 | 56.1 | 3.51 |

TABLE 4A-continued

4th Embodiment
f = 2.84 mm, Fno = 2.40, HFOV = 44.9 deg.

| Surface # | | Curvature Radius | | Thickness | Material | Index | Abbe # | Focal Length |
|---|---|---|---|---|---|---|---|---|
| 3 | | 3.0666 | (ASP) | 0.145 | | | | |
| 4 | Lens 2 | 5.2408 | (ASP) | 0.190 | Plastic | 1.669 | 19.5 | −10.26 |
| 5 | | 2.9284 | (ASP) | 0.081 | | | | |
| 6 | Stop | Plano | | 0.052 | | | | |
| 7 | Lens 3 | 44.7467 | (ASP) | 0.267 | Plastic | 1.544 | 56.0 | 6.81 |
| 8 | | −4.0326 | (ASP) | 0.566 | | | | |
| 9 | Lens 4 | 3.8416 | (ASP) | 0.368 | Plastic | 1.669 | 19.5 | −5.97 |
| 10 | | 1.8829 | (ASP) | 0.089 | | | | |
| 11 | Lens 5 | 0.7023 | (ASP) | 0.386 | Plastic | 1.534 | 55.9 | 8.54 |
| 12 | | 0.6714 | (ASP) | 0.396 | | | | |
| 13 | Filter | Plano | | 0.210 | Glass | 1.517 | 64.2 | — |
| 14 | | Plano | | 0.323 | | | | |
| 15 | Image | Plano | | — | | | | |

Note:
Reference wavelength is 587.6 nm (d-line).
An effective radius of the stop S1 (Surface 6) is 0.670 mm.

TABLE 4B

Aspheric Coefficients

| Surface # | 2 | 3 | 4 | 5 |
|---|---|---|---|---|
| k= | −7.49453000E−01 | −6.19874000E+00 | 1.50627000E+01 | −1.42518000E+01 |
| A4= | 3.91891689E−02 | −1.50713265E−01 | −4.64440421E−01 | −2.60467788E−01 |
| A6= | −7.21507975E−02 | −2.53510832E−01 | 2.51887322E−01 | 4.03466518E−01 |
| A8= | 5.91685689E−01 | −5.08270481E−01 | −4.00959595E+00 | −2.21594953E+00 |
| A10= | −2.63605525E+00 | 3.35835814E+00 | 2.27282913E+01 | 8.75613025E+00 |
| A12= | 2.97898115E+00 | −1.53647408E+01 | −7.46300865E+01 | −1.36816689E+01 |
| A14= | — | 2.77857843E+01 | 1.51685283E+02 | 9.53678696E+00 |
| A16= | — | — | −1.15192637E+02 | — |

| Surface # | 7 | 8 | 9 | 10 |
|---|---|---|---|---|
| k= | 9.00000000E+01 | −2.14592000E+01 | −5.42256000E+01 | −3.97327000E+01 |
| A4= | −2.07711124E−01 | −1.23510018E−01 | 4.16630796E−01 | −4.88675871E−02 |
| A6= | −2.30057846E−02 | −1.42135806E+00 | −1.97622682E+00 | 7.11390451E−01 |
| A8= | 3.30575113E+00 | 1.04224275E+00 | 5.86567110E+00 | −2.68632323E+00 |
| A10= | −1.80110105E+01 | −3.79401704E+01 | −1.33821386E+01 | 4.69600613E+00 |
| A12= | 4.94732445E+01 | 8.30372716E+01 | 2.06447430E+01 | −5.12519566E+00 |
| A14= | −6.41308923E+01 | −1.03479344E+02 | −2.08343198E+01 | 3.78596081E+00 |
| A16= | 2.96572782E+01 | 6.75547852E+01 | 1.33416083E+01 | −1.92442823E+00 |
| A18= | — | −1.81072366E+01 | −5.16840058E+00 | 6.60297582E−01 |
| A20= | — | — | 1.09914009E+00 | −1.45080728E−01 |
| A22= | — | — | −9.82625858E−02 | 1.83089613E−02 |
| A24= | — | — | — | −1.00412833E−03 |

| Surface # | 11 | 12 |
|---|---|---|
| k= | −5.00684000E+00 | −3.61987000E+00 |
| A4= | −9.12563388E−01 | −5.84622761E−01 |
| A6= | 1.93459739E+00 | 1.04185362E+00 |
| A8= | −3.74418876E+00 | −1.63139749E+00 |
| A10= | 4.90316298E+00 | 1.85594553E+00 |
| A12= | −4.12836566E+00 | −1.45917195E+00 |
| A14= | 2.30831345E+00 | 8.02938424E−01 |
| A16= | −8.80740899E−01 | −3.14182358E−01 |
| A18= | 2.31338031E−01 | 8.79020825E−02 |
| A20= | −4.12851622E−02 | −1.74506758E−02 |
| A22= | 4.79267947E−03 | 2.39855992E−03 |
| A24= | −3.26955090E−04 | −2.16802681E−04 |
| A26= | 9.95692880E−06 | 1.15784315E−05 |
| A28= | — | −2.76469089E−07 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| | | | |
|---|---|---|---|
| f [mm] | 2.84 | f/f4 | −0.48 |
| Fno | 2.40 | f/f5 | 0.33 |
| HFOV [deg.] | 44.9 | f/R2 | 0.92 |
| (CT2 + T23 + CT3)/T34 | 1.04 | f/R8 | 1.51 |
| (R1 + R2)/(R1 − R2) | −2.34 | f/R10 | 4.22 |
| (R1 + R4)/(R1 − R4) | −2.45 | f12/f45 | −0.41 |
| (R1 + R6)/(R1 − R6) | −0.53 | R8/R9 | 2.68 |
| (R5 + R6)/(R5 − R6) | 0.83 | T12/T23 | 1.09 |
| (R7 + R10)/(R7 − R10) | 1.42 | T12/T45 | 1.63 |
| (R9 + R10)/(R9 − R10) | 44.46 | T34/(T12 + T23 + T45) | 1.54 |
| |f5/f2| | 0.83 | T34/T23 | 4.26 |
| CT1/CT2 | 2.03 | TD/BL | 2.72 |
| CT1/T45 | 4.34 | V2 | 19.5 |
| CT3/T34 | 0.47 | V2 + V4 | 38.9 |
| f/f1 | 0.81 | V3 | 56.0 |
| f/f2 | −0.28 | V4 | 19.5 |
| f/f3 | 0.42 | ΣAT/TD | 0.37 |

5th Embodiment

Figure 9:
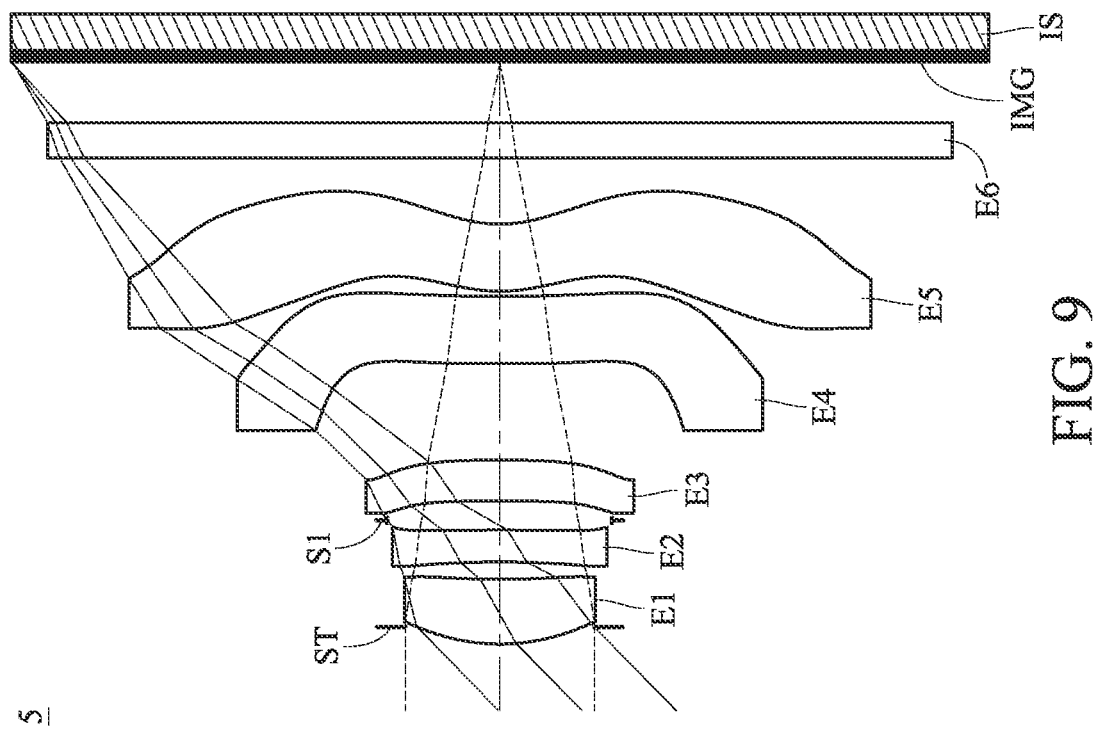
FIG. 9 is a schematic view of an image capturing unit according to the 5th embodiment of the present disclosure.
Figure 10:
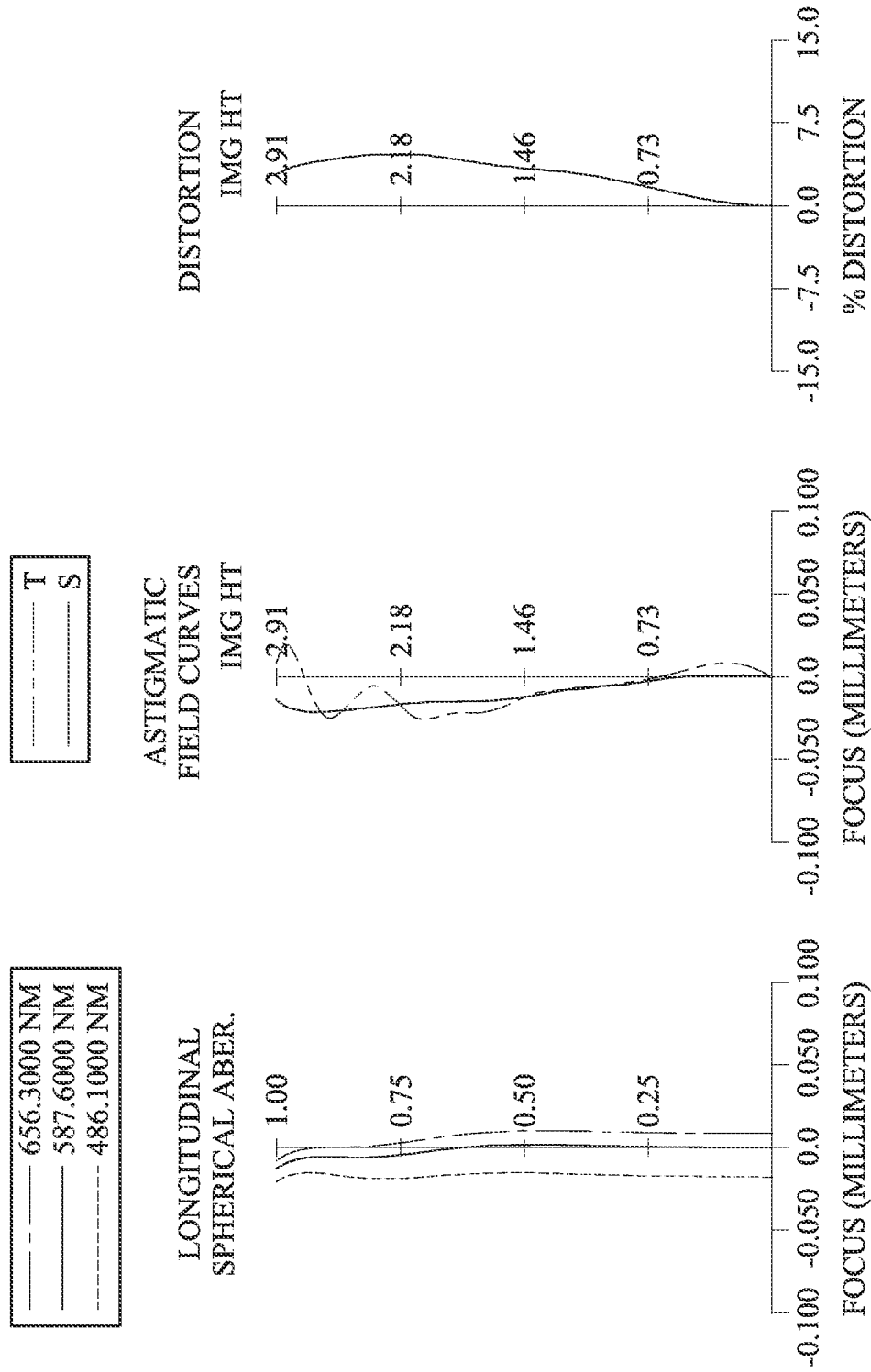
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one critical point in an off-axis region thereof. The image-side surface of the third lens element E3 has one critical point in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has two critical points in an off-axis region thereof. The image-side surface of the fourth lens element E4 has one critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The detailed optical data of the 5th embodiment are shown in Table 5A and the aspheric surface data are shown in Table 5B below.

TABLE 5A

5th Embodiment
f = 2.90 mm, Fno = 2.57, HFOV = 44.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.102 | | | | |
| 2 | Lens 1 | 1.2134 | (ASP) | 0.387 | Plastic | 1.545 | 56.1 | 2.92 |
| 3 | | 4.5297 | (ASP) | 0.103 | | | | |
| 4 | Lens 2 | −5.7852 | (ASP) | 0.190 | Plastic | 1.660 | 20.4 | −14.36 |
| 5 | | −15.0457 | (ASP) | 0.058 | | | | |
| 6 | Stop | Plano | | 0.115 | | | | |

TABLE 5A-continued

5th Embodiment
f = 2.90 mm, Fno = 2.57, HFOV = 44.3 deg.

| Surface # | | Curvature Radius | | Thickness | Material | Index | Abbe # | Focal Length |
|---|---|---|---|---|---|---|---|---|
| 7 | Lens 3 | 580.7771 | (ASP) | 0.245 | Plastic | 1.544 | 56.0 | 17.24 |
| 8 | | −9.5328 | (ASP) | 0.576 | | | | |
| 9 | Lens 4 | −84.4843 | (ASP) | 0.402 | Plastic | 1.660 | 20.4 | −25.74 |
| 10 | | 21.3038 | (ASP) | 0.030 | | | | |
| 11 | Lens 5 | 0.9546 | (ASP) | 0.400 | Plastic | 1.544 | 56.0 | −27.89 |
| 12 | | 0.7655 | (ASP) | 0.396 | | | | |
| 13 | Filter | Plano | | 0.210 | Glass | 1.517 | 64.2 | — |
| 14 | | Plano | | 0.362 | | | | |
| 15 | Image | Plano | | — | | | | |

Note:
Reference wavelength is 587.6 nm (d-line).
An effective radius of the stop S1 (Surface 6) is 0.670 mm.

TABLE 5B

Aspheric Coefficients

| Surface # | 2 | 3 | 4 | 5 |
|---|---|---|---|---|
| k= | −9.68936000E−01 | −2.89132000E+01 | −8.99375000E+01 | −6.50150000E+01 |
| A4= | 2.76812151E−02 | −8.32860007E−02 | −7.65807615E−02 | −5.55766056E−03 |
| A6= | 2.25356563E−01 | −4.43067220E−01 | −6.97230633E−04 | 3.75177297E−01 |
| A8= | −2.13042205E+00 | 1.89808660E+00 | 5.15328216E−01 | 2.83268375E−01 |
| A10= | 8.36128297E+00 | −1.39998284E+01 | 7.12973725E+00 | −2.70562647E−01 |
| A12= | −2.00507711E+01 | 3.55203641E+01 | −8.50245854E+00 | −1.18621407E+01 |
| A14= | 1.84399696E+01 | −2.45653512E+01 | 3.17233202E+02 | 4.97162705E+01 |
| A16= | — | — | −3.74549375E+02 | −4.87735876E+01 |
| A18= | — | — | −1.17008708E+02 | — |
| A20= | — | — | 3.53723121E+02 | — |

| Surface # | 7 | 8 | 9 | 10 |
|---|---|---|---|---|
| k= | −9.00000000E+01 | 3.66697000E+01 | −9.00000000E+01 | −8.82597000E+01 |
| A4= | −3.08680018E−01 | −2.28217581E−01 | 3.91356320E−01 | 1.02487956E−01 |
| A6= | −2.21451297E+00 | −1.34798036E+00 | −1.02438647E+00 | 1.22222595E−01 |
| A8= | 2.98521856E+01 | 1.10317031E+01 | 1.66405077E−01 | −1.63569439E+00 |
| A10= | −2.25346455E+02 | −5.34936388E+01 | 5.02272661E+00 | 4.49573139E+00 |
| A12= | 1.03056529E+03 | 1.57815322E+02 | −1.58377017E+01 | −7.13065194E+00 |
| A14= | −2.90080243E+03 | −2.76351299E+02 | 2.43972251E+01 | 7.20651199E+00 |
| A16= | 4.85251843E+03 | 2.64525816E+02 | −2.15817173E+01 | −4.74683947E+00 |
| A18= | −4.34509098E+03 | −1.04361337E+02 | 1.08512862E+01 | 2.01954248E+00 |
| A20= | 1.58270929E+03 | — | −2.83258240E+00 | −5.32555798E−01 |
| A22= | — | — | 2.95698394E−01 | 7.88488434E−02 |
| A24= | — | — | — | −4.99599819E−03 |

| Surface # | 11 | 12 |
|---|---|---|
| k= | −4.27464000E+00 | −2.97569000E+00 |
| A4= | −6.04285621E−01 | −4.79511210E−01 |
| A6= | 5.29477927E−01 | 4.98711954E−01 |
| A8= | −8.06059177E−01 | −4.30683673E−01 |
| A10= | 1.36810980E+00 | 3.09359799E−01 |
| A12= | −1.41516291E+00 | −2.04125456E−01 |
| A14= | 9.00320553E−01 | 1.31179415E−01 |
| A16= | −3.71688348E−01 | −7.14715259E−02 |
| A18= | 1.02156789E−01 | 2.86487826E−02 |
| A20= | −1.86263024E−02 | −7.92626400E−03 |
| A22= | 2.16947710E−03 | 1.46092078E−03 |
| A24= | −1.46380185E−04 | −1.70827176E−04 |
| A26= | 4.35780647E−06 | 1.14466575E−05 |
| A28= | — | −3.34357712E−07 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

Schematic Parameters

| | | | |
|---|---|---|---|
| f [mm] | 2.90 | f/f4 | −0.11 |
| Fno | 2.57 | f/f5 | −0.10 |
| HFOV [deg.] | 44.3 | f/R2 | 0.64 |
| (CT2 + T23 + CT3)/T34 | 1.06 | f/R8 | 0.14 |
| (R1 + R2)/(R1 − R2) | −1.73 | f/R10 | 3.79 |
| (R1 + R4)/(R1 − R4) | −0.85 | f12/f45 | −0.29 |
| (R1 + R6)/(R1 − R6) | −0.77 | R8/R9 | 22.32 |
| (R5 + R6)/(R5 − R6) | 0.97 | T12/T23 | 0.60 |
| (R7 + R10)/(R7 − R10) | 0.98 | T12/T45 | 3.44 |
| (R9 + R10)/(R9 − R10) | 9.10 | T34/(T12 + T23 + T45) | 1.88 |
| \|f5/f2\| | 1.94 | T34/T23 | 3.32 |
| CT1/CT2 | 2.04 | TD/BL | 2.59 |
| CT1/T45 | 12.90 | V2 | 20.4 |
| CT3/T34 | 0.43 | V2 + V4 | 40.8 |
| f/f1 | 0.99 | V3 | 56.0 |
| f/f2 | −0.20 | V4 | 20.4 |
| f/f3 | 0.17 | ΣAT/TD | 0.35 |

6th Embodiment

Figure 11:
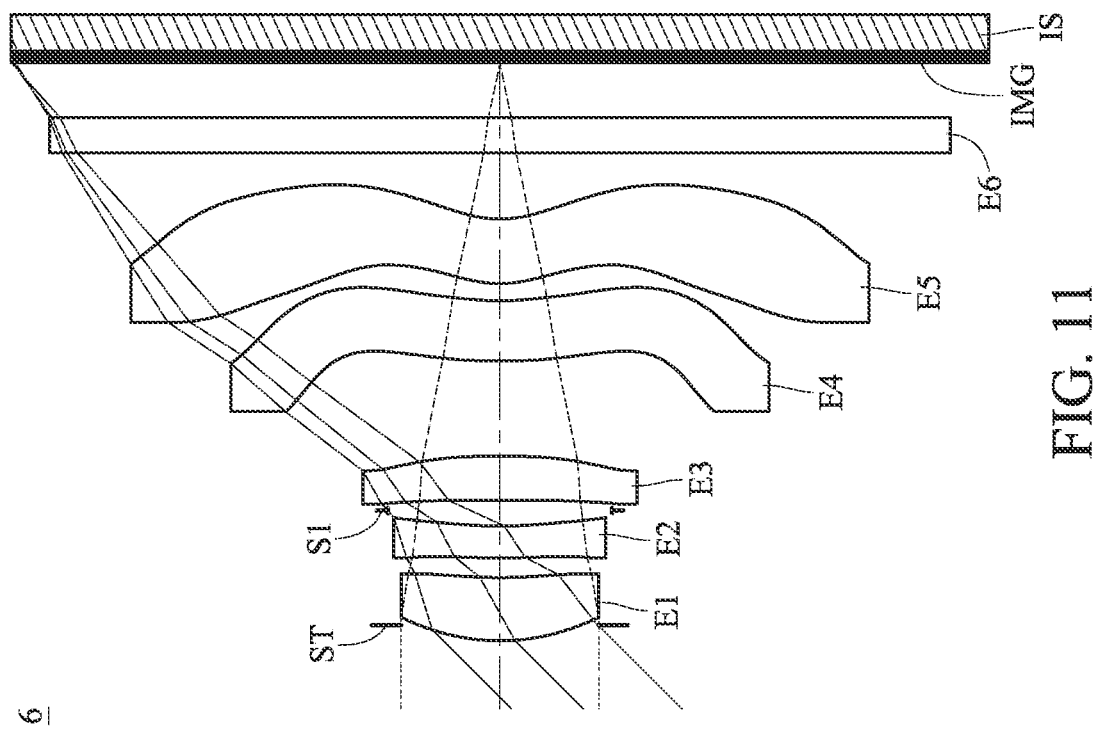
FIG. 11 is a schematic view of an image capturing unit according to the 6th embodiment of the present disclosure.
Figure 12:
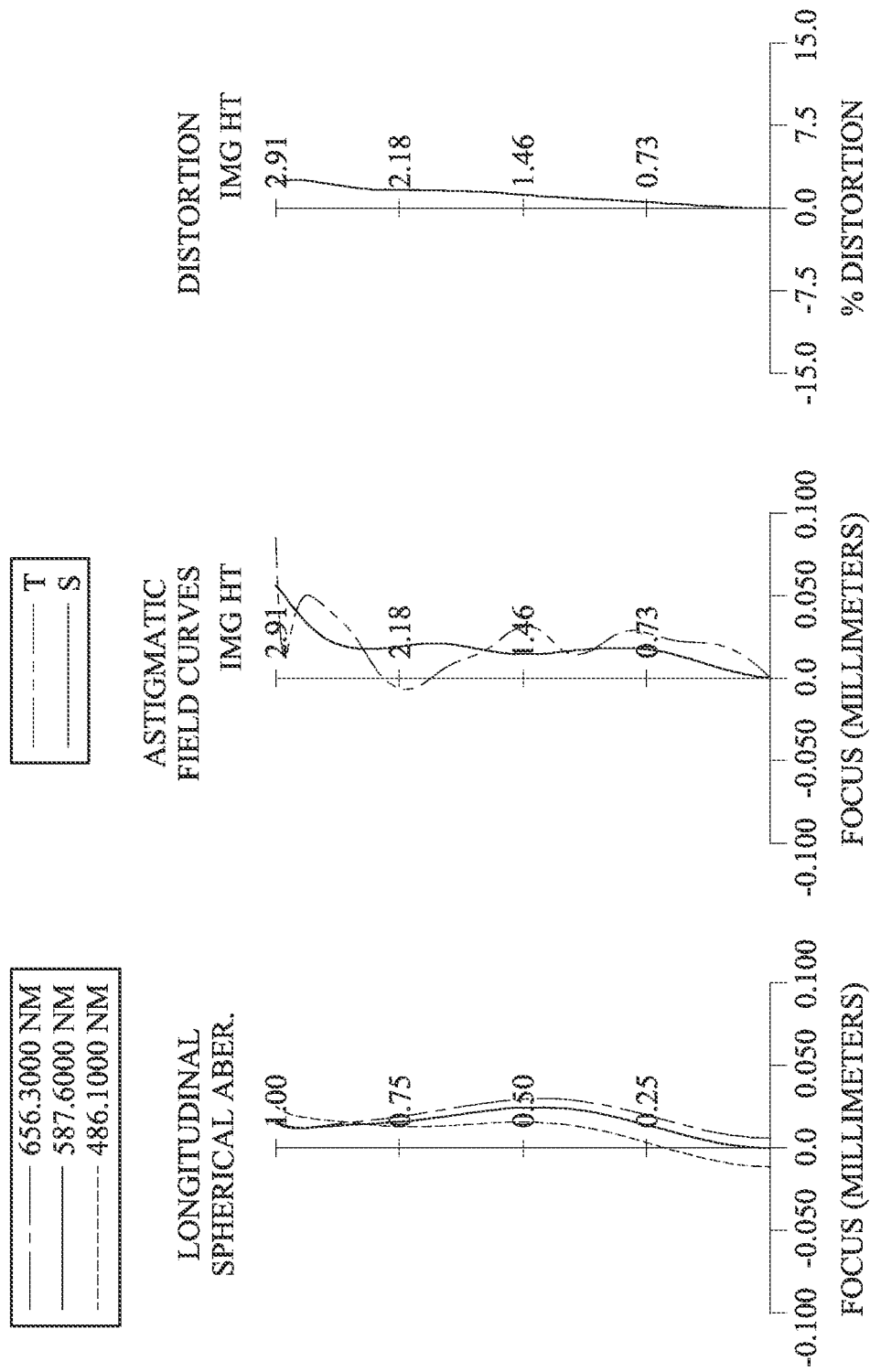
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical imaging lens system (its reference numeral is omitted) of the present disclosure and an image sensor IS. The optical imaging lens system includes, in order from an object side to an image side along an optical axis, an aperture stop ST, a first lens element E1, a second lens element E2, a stop S1, a third lens element E3, a fourth lens element E4, a fifth lens element E5, a filter E6 and an image surface IMG. The optical imaging lens system includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one inflection point. The image-side surface of the first lens element E1 has one critical point in an off-axis region thereof.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The object-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has three inflection points. The image-side surface of the third lens element E3 has one inflection point. The object-side surface of the third lens element E3 has one critical point in an off-axis region thereof. The image-side surface of the third lens element E3 has one critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has two critical points in an off-axis region thereof. The image-side surface of the fifth lens element E5 has one critical point in an off-axis region thereof.

The filter E6 is made of glass material and located between the fifth lens element E5 and the image surface IMG, and will not affect the focal length of the optical imaging lens system. The image sensor IS is disposed on or near the image surface IMG of the optical imaging lens system.

The detailed optical data of the 6th embodiment are shown in Table 6A and the aspheric surface data are shown in Table 6B below.

TABLE 6A

6th Embodiment
f = 2.83 mm, Fno = 2.40, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.093 | | | | |
| 2 | Lens 1 | 1.2629 | (ASP) | 0.379 | Plastic | 1.545 | 56.1 | 3.63 |
| 3 | | 3.1239 | (ASP) | 0.117 | | | | |

TABLE 6A-continued

6th Embodiment
f = 2.83 mm, Fno = 2.40, HFOV = 45.0 deg.

| Surface # |        | Curvature Radius |       | Thickness | Material | Index | Abbe # | Focal Length |
|-----------|--------|------------------|-------|-----------|----------|-------|--------|--------------|
| 4         | Lens 2 | 3.8062           | (ASP) | 0.190     | Plastic  | 1.669 | 19.5   | −12.09       |
| 5         |        | 2.5364           | (ASP) | 0.092     |          |       |        |              |
| 6         | Stop   | Plano            |       | 0.063     |          |       |        |              |
| 7         | Lens 3 | 53.1148          | (ASP) | 0.265     | Plastic  | 1.544 | 56.0   | 7.19         |
| 8         |        | −4.2138          | (ASP) | 0.567     |          |       |        |              |
| 9         | Lens 4 | 3.6985           | (ASP) | 0.361     | Plastic  | 1.669 | 19.5   | −4.97        |
| 10        |        | 1.6822           | (ASP) | 0.102     |          |       |        |              |
| 11        | Lens 5 | 0.6472           | (ASP) | 0.386     | Plastic  | 1.534 | 55.9   | 6.02         |
| 12        |        | 0.6421           | (ASP) | 0.396     |          |       |        |              |
| 13        | Filter | Plano            |       | 0.210     | Glass    | 1.517 | 64.2   | —            |
| 14        |        | Plano            |       | 0.330     |          |       |        |              |
| 15        | Image  | Plano            |       | —         |          |       |        |              |

Note:
Reference wavelength is 587.6 nm (d-line).

An effective radius of the stop S1 (Surface 6) is 0.670 mm.

TABLE 6B

Aspheric Coefficients

| Surface # | 2 | 3 | 4 | 5 |
|---|---|---|---|---|
| k= | −8.94327000E−01 | −1.12591000E+01 | 1.28495000E+01 | −8.56732000E+00 |
| A4= | 3.73266959E−02 | −2.00316189E−01 | −5.54586210E−01 | −2.72353920E−01 |
| A6= | −8.42313497E−02 | −2.31408145E−01 | 7.80450777E−01 | 2.88683543E−01 |
| A8= | 5.29985166E−01 | 3.52217004E−01 | −6.27358387E+00 | −1.15364511E−01 |
| A10= | −2.31765944E+00 | −2.15412504E+00 | 3.11403266E+01 | 1.69651783E+00 |
| A12= | 2.47656276E+00 | 1.45776694E+00 | −9.01664873E+01 | −3.87473117E+00 |
| A14= | — | 1.00446676E+01 | 1.61442232E+02 | 4.09864470E+00 |
| A16= | — | — | −1.15192637E+02 | — |

| Surface # | 7 | 8 | 9 | 10 |
|---|---|---|---|---|
| k= | −1.97118000E+01 | −1.54627000E+01 | −4.47793000E+01 | −4.39129000E+01 |
| A4= | −1.82380148E−01 | −9.79893925E−02 | 3.70433324E−01 | −1.27779074E−01 |
| A6= | −6.18754721E−01 | −1.65618006E+00 | −1.73851531E+00 | 1.25517844E+00 |
| A8= | 6.57525973E+00 | 1.13306884E+01 | 5.36403490E+00 | −4.34078074E+00 |
| A10= | −2.77831728E+01 | −4.09401131E+01 | −1.33137122E+01 | 7.57494019E+00 |
| A12= | 6.72350170E+01 | 9.02082542E+01 | 2.21556196E+01 | −8.30623189E+00 |
| A14= | −8.24705728E+01 | −1.14004576E+02 | −2.36857073E+01 | 6.13475252E+00 |
| A16= | 3.74917418E+01 | 7.60158551E+01 | 1.58307770E+01 | −3.10274647E+00 |
| A18= | — | −2.09019698E+01 | −6.33936381E+00 | 1.05679149E+00 |
| A20= | — | — | 1.38542928E+00 | −2.30500767E−01 |
| A22= | — | — | −1.26814805E−01 | 2.89166634E−02 |
| A24= | — | — | — | −1.57949104E−03 |

| Surface # | 11 | 12 |
|---|---|---|
| k= | −4.90355000E+00 | −3.40768000E+00 |
| A4= | −1.00326439E+00 | −6.80009320E−01 |
| A6= | 2.35473446E+00 | 1.36631711E+00 |
| A8= | −4.58687667E+00 | −2.24921349E+00 |
| A10= | 5.86404931E+00 | 2.62541371E+00 |
| A12= | −4.82031013E+00 | −2.11734520E+00 |
| A14= | 2.64074686E+00 | 1.19664680E+00 |
| A16= | −9.90390196E−01 | −4.80365483E−01 |
| A18= | 2.56357362E−01 | 1.37499316E−01 |
| A20= | −4.51761691E−02 | −2.78341234E−02 |
| A22= | 5.18643925E−03 | 3.88828241E−03 |
| A24= | −3.50268290E−04 | −3.56174747E−04 |
| A26= | 1.05655835E−05 | 1.92321689E−05 |
| A28= | — | −4.63504177E−07 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| | | | |
|---|---|---|---|
| f [mm] | 2.83 | f/f4 | −0.57 |
| Fno | 2.40 | f/f5 | 0.47 |
| HFOV [deg.] | 45.0 | f/R2 | 0.91 |
| (CT2 + T23 + CT3)/T34 | 1.08 | f/R8 | 1.68 |
| (R1 + R2)/(R1 − R2) | −2.36 | f/R10 | 4.41 |
| (R1 + R4)/(R1 − R4) | −2.98 | f12/f45 | −0.38 |
| (R1 + R6)/(R1 − R6) | −0.54 | R8/R9 | 2.60 |
| (R5 + R6)/(R5 − R6) | 0.85 | T12/T23 | 0.75 |
| (R7 + R10)/(R7 − R10) | 1.42 | T12/T45 | 1.15 |
| (R9 + R10)/(R9 − R10) | 252.80 | T34/(T12 + T23 + T45) | 1.52 |
| \|f5/f2\| | 0.50 | T34/T23 | 3.66 |
| CT1/CT2 | 1.99 | TD/BL | 2.69 |
| CT1/T45 | 3.72 | V2 | 19.5 |
| CT3/T34 | 0.47 | V2 + V4 | 38.9 |
| f/f1 | 0.78 | V3 | 56.0 |
| f/f2 | −0.23 | V4 | 19.5 |
| f/f3 | 0.39 | ΣAT/TD | 0.37 |

7th Embodiment

Figure 13:
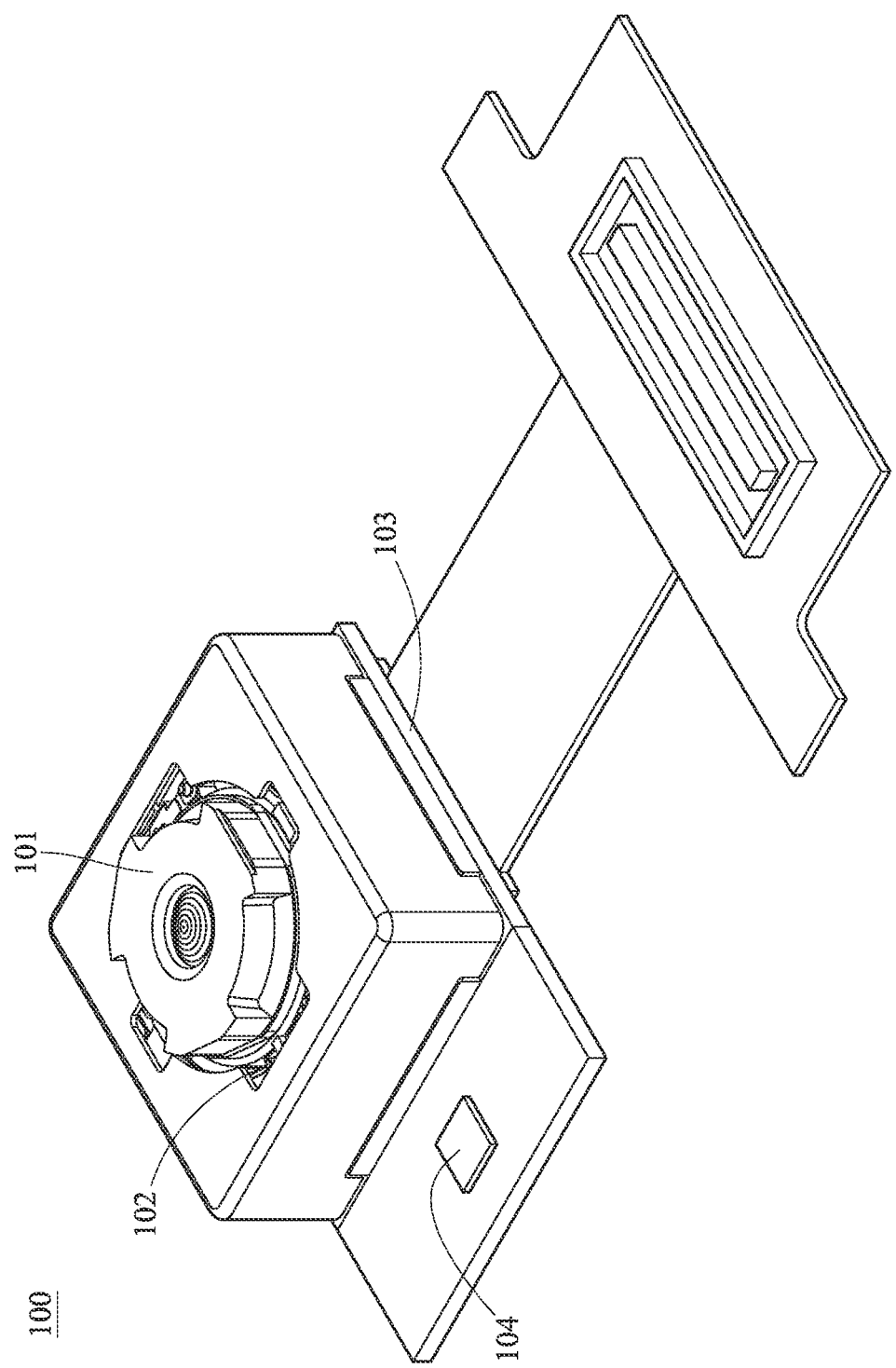
FIG. 13 is a perspective view of an image capturing unit according to the 7th embodiment of the present disclosure.

FIG. 13 is a perspective view of an image capturing unit according to the 7th embodiment of the present disclosure. In this embodiment, an image capturing unit 100 is a camera module including a lens unit 101, a driving device 102, an image sensor 103 and an image stabilizer 104. The lens unit 101 includes the optical imaging lens system disclosed in the 1st embodiment, a barrel and a holder member (their reference numerals are omitted) for holding the optical imaging lens system. However, the lens unit 101 may alternatively be provided with the optical imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the optical imaging lens system to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

Figure 14:
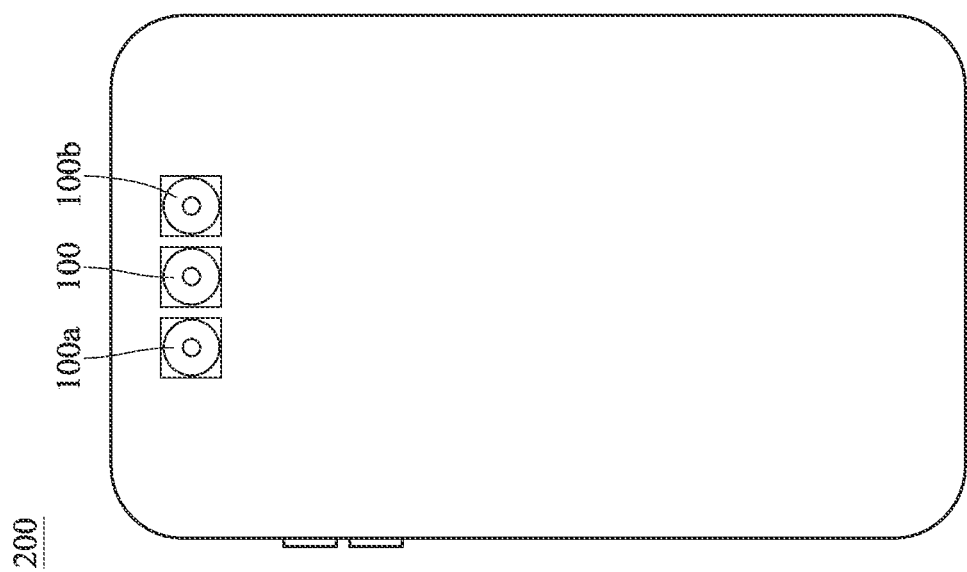
FIG. 14 is one perspective view of an electronic device according to the 8th embodiment of the present disclosure.
Figure 15:
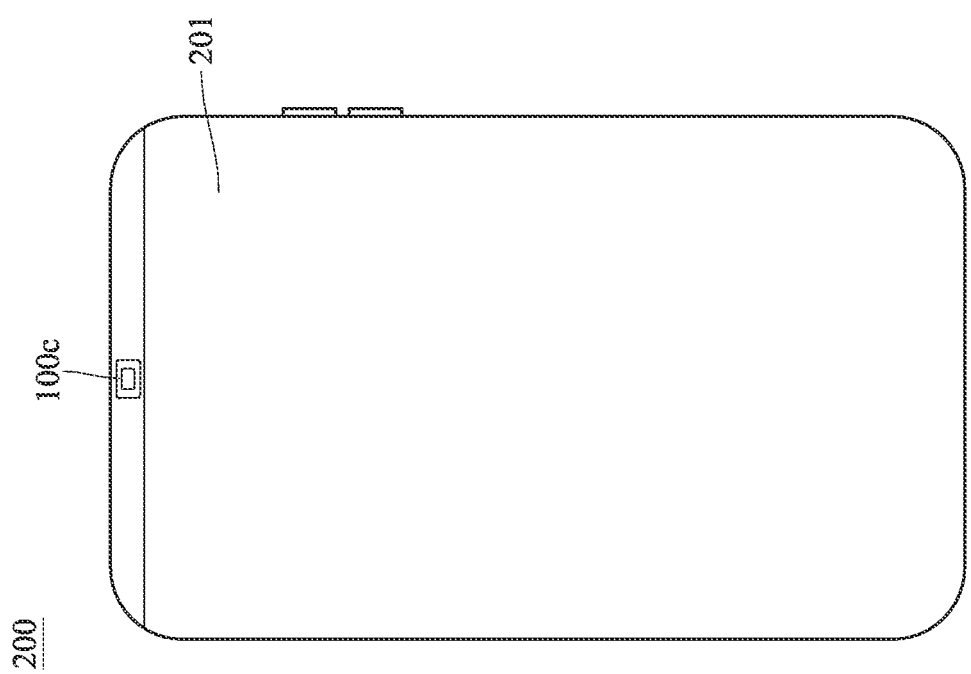
FIG. 15 is another perspective view of the electronic device in FIG. 14.

FIG. 14 is one perspective view of an electronic device according to the 8th embodiment of the present disclosure. FIG. 15 is another perspective view of the electronic device in FIG. 14.

In this embodiment, an electronic device 200 is a smartphone including the image capturing unit 100 disclosed in the 7th embodiment, an image capturing unit 100a, an image capturing unit 100b, an image capturing unit 100c and a display unit 201. As shown in FIG. 14, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 15, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the optical imaging lens system of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an optical imaging lens system such as the optical imaging lens system of the present disclosure, a barrel and a holder member for holding the optical imaging lens system.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 15, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

9th Embodiment

Figure 16:
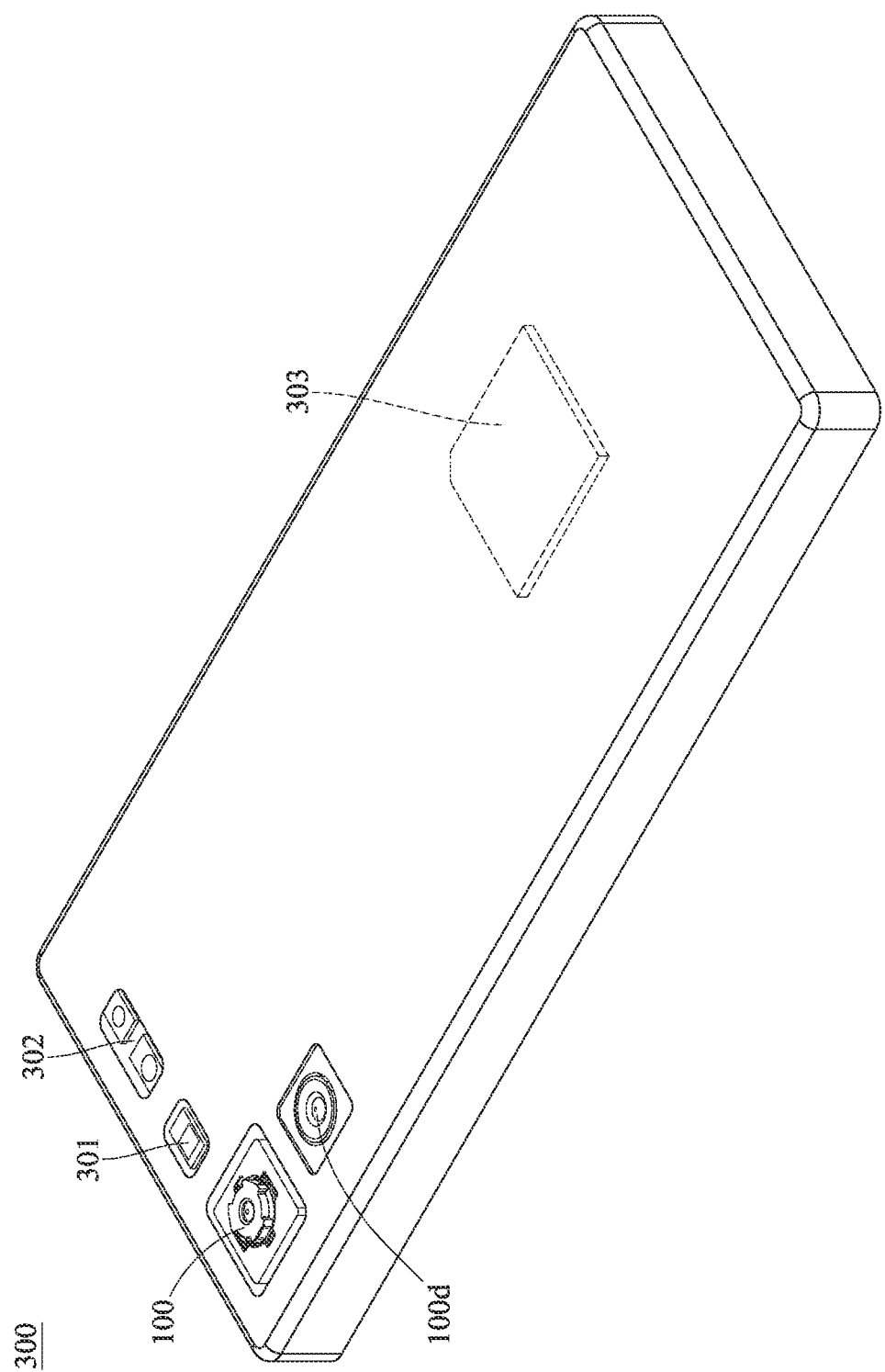
FIG. 16 is one perspective view of an electronic device according to the 9th embodiment of the present disclosure.
Figure 17:
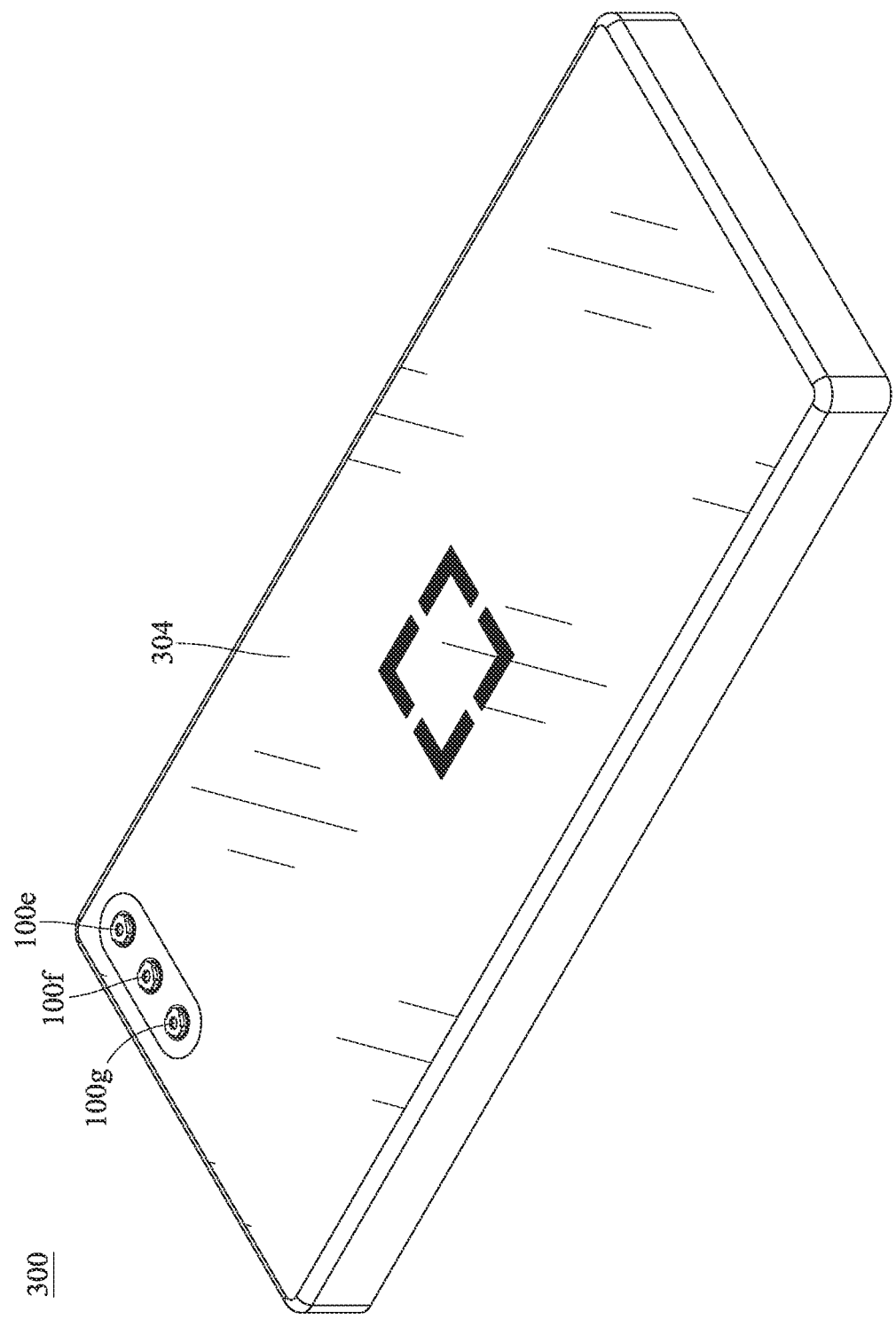
FIG. 17 is another perspective view of the electronic device in FIG. 16.
Figure 18:
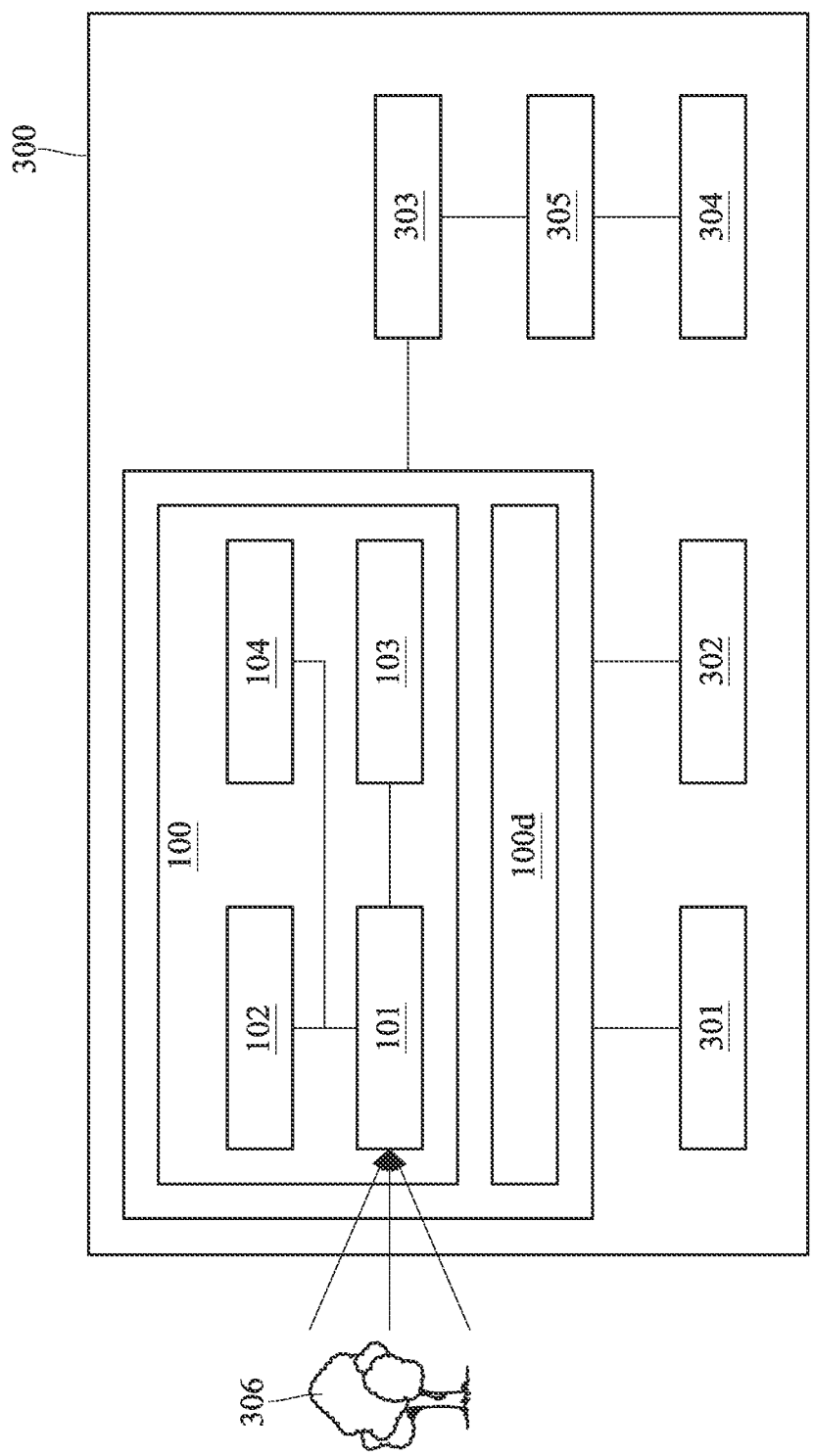
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 300 is a smartphone including the image capturing unit 100 disclosed in the 7th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the optical imaging lens system of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an optical imaging lens system such as the optical imaging lens system of the present disclosure, a barrel and a holder member for holding the optical imaging lens system.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100 and 100d have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

10th Embodiment

Figure 19:
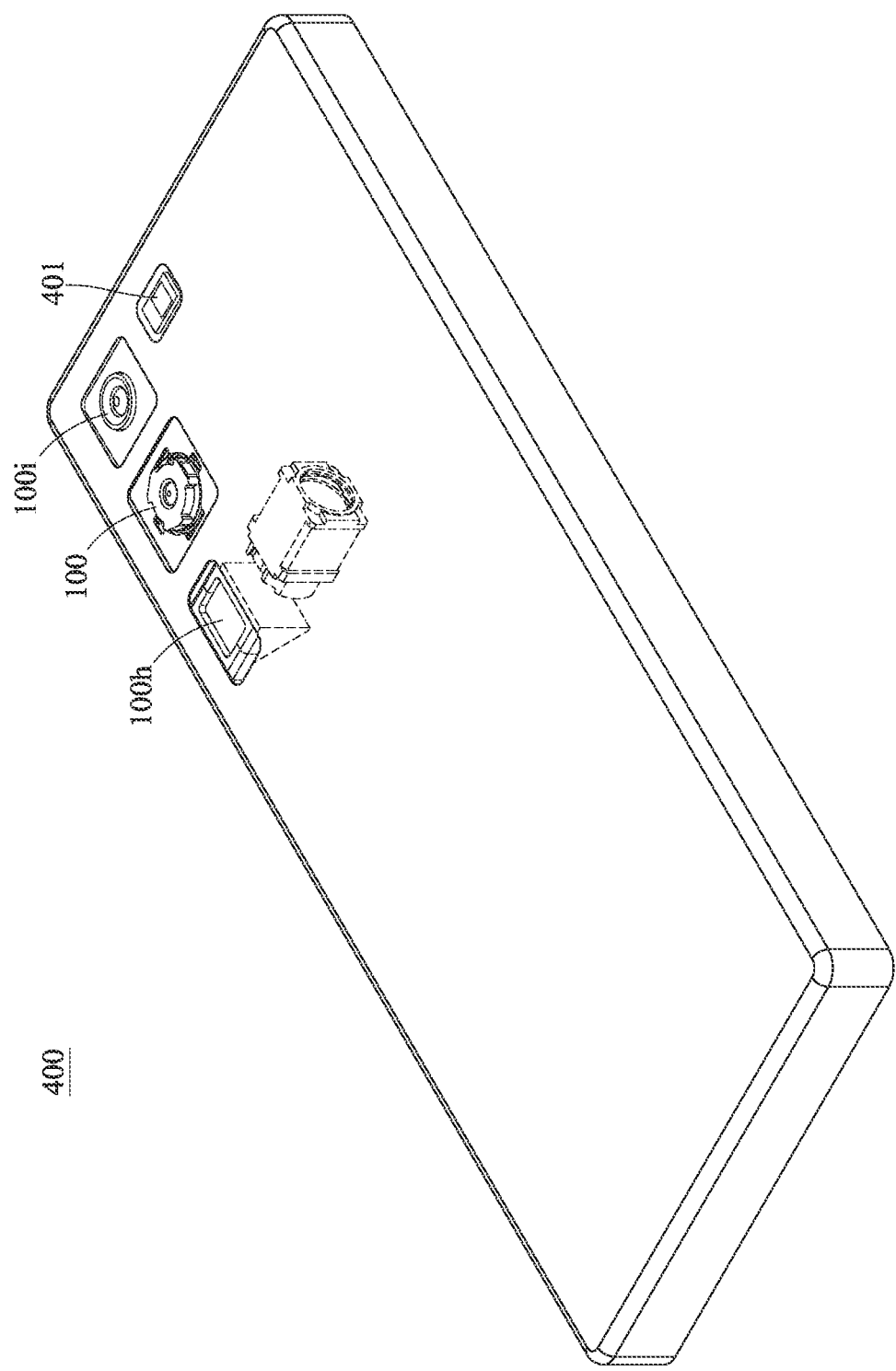
FIG. 19 is one perspective view of an electronic device according to the 10th embodiment of the present disclosure.

FIG. 19 is one perspective view of an electronic device according to the 10th embodiment of the present disclosure.

In this embodiment, an electronic device 400 is a smartphone including the image capturing unit 100 disclosed in the 7th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the optical imaging lens system of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 22 to FIG. 24, which can be referred to foregoing descriptions corresponding to FIG. 22 to FIG. 24, and the details in this regard will not be provided again. In this embodiment, the electronic device 400 includes multiple image capturing units 100, 100h and 100i, but the present disclosure is not limited to the number and arrangement of image capturing units.

When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

11th Embodiment

Figure 20:
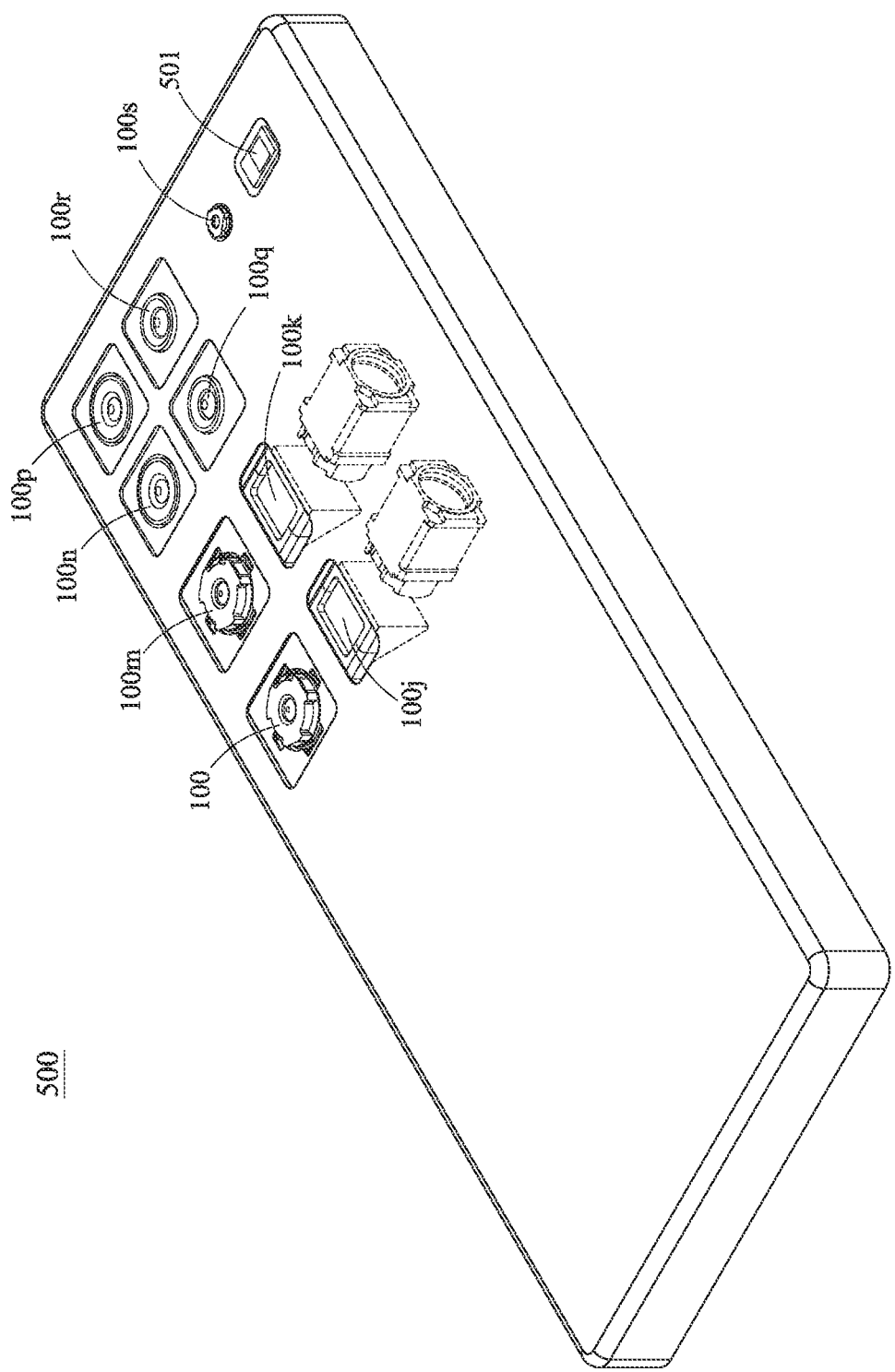
FIG. 20 is one perspective view of an electronic device according to the 11th embodiment of the present disclosure.

FIG. 20 is one perspective view of an electronic device according to the 11th embodiment of the present disclosure.

In this embodiment, an electronic device 500 is a smartphone including the image capturing unit 100 disclosed in the 7th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the optical imaging lens system of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 22 to FIG. 24, which can be referred to foregoing descriptions corresponding to FIG. 22 to FIG. 24, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement.

Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-6C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein a total number of lens elements of the optical imaging lens system is five, the first lens element has positive refractive power, the image-side surface of the fourth lens element is concave in a paraxial region thereof, the object-side surface of the fifth lens element is convex in a paraxial region thereof, and the image-side surface of the fifth lens element is concave in a paraxial region thereof;

wherein a focal length of the optical imaging lens system is f, a focal length of the second lens element is f2, a focal length of the fourth lens element is f4, a focal length of the fifth lens element is f5, a composite focal length of the first lens element and the second lens element is f12, a composite focal length of the fourth lens element and the fifth lens element is f45, a curvature radius of the object-side surface of the third lens element is R5, a curvature radius of the image-side surface of the third lens element is R6, a curvature radius of the image-side surface of the fifth lens element is R10, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$-1.85 < f/f4 < 0.25;$ $-0.20 < f/f5 < 2.00;$ $-0.80 < f12/f45;$ $-1.30 < (R5+R6)/(R5-R6) < 2.00;$ $0.30 < |f5/f2| < 2.60;$ $0.55 < T34/(T12+T23+T45) < 5.50;$ $0.60 < T12/T45 < 6.00;$ and $0.20 < f/R10.$ 2. The optical imaging lens system of claim 1, wherein the image-side surface of the fourth lens element has at least one inflection point, the image-side surface of the fifth lens element has at least one inflection point, an Abbe number of the fourth lens element is V4, and the following condition is satisfied:

$12.0 < V4 < 35.0.$

3. The optical imaging lens system of claim 1, wherein a curvature radius of the object-side surface of the fifth lens element is R9, the curvature radius of the image-side surface of the fifth lens element is R10, and the following condition is satisfied:

$6.60 < (R9+R10)/(R9-R10).$

4. The optical imaging lens system of claim 1, wherein the focal length of the optical imaging lens system is f, a curvature radius of the image-side surface of the first lens element is R2, and the following condition is satisfied:

0.30<f/R2<1.20.

5. The optical imaging lens system of claim 1, wherein a sum of axial distances between each of all adjacent lens elements of the optical imaging lens system is ΣAT, an axial distance between the object-side surface of the first lens element and the image-side surface of the fifth lens element is TD, and the following condition is satisfied:

0.30<ΣAT/TD<0.50.

6. The optical imaging lens system of claim 1, wherein the image-side surface of the third lens element is convex in a paraxial region thereof.

7. The optical imaging lens system of claim 1, wherein the composite focal length of the first lens element and the second lens element is f12, the composite focal length of the fourth lens element and the fifth lens element is f45, and the following condition is satisfied:

−0.50<f12/f45.

8. An image capturing unit, comprising:
the optical imaging lens system of claim 1; and
an image sensor disposed on an image surface of the optical imaging lens system.

9. An electronic device, comprising:
the image capturing unit of claim 8.

10. An optical imaging lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein a total number of lens elements of the optical imaging lens system is five, the image-side surface of the fourth lens element is concave in a paraxial region thereof, the image-side surface of the fourth lens element has at least one inflection point, the image-side surface of the fifth lens element is concave in a paraxial region thereof, the image-side surface of the fifth lens element has at least one inflection point, and the optical imaging lens system further comprises an aperture stop located at an object side of the first lens element;
wherein a focal length of the optical imaging lens system is f, a focal length of the second lens element is f2, a focal length of the fourth lens element is f4, a focal length of the fifth lens element is f5, a curvature radius of the object-side surface of the third lens element is R5, a curvature radius of the image-side surface of the third lens element is R6, a central thickness of the second lens element is CT2, a central thickness of the third lens element is CT3, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

−2.00<f/f4<0.30;

−0.20<f/f5<2.00;

−1.00<(R5+R6)/(R5−R6)<2.10;

0.10<|f5/f2|<5.50;

0.75<(CT2+T23+CT3)/T34<2.00; and 0.60<T12/T45<40.0.

11. The optical imaging lens system of claim 10, wherein the focal length of the optical imaging lens system is f, a curvature radius of the image-side surface of the first lens element is R2, and the following condition is satisfied:

0.50<f/R2<1.20.

12. The optical imaging lens system of claim 10, wherein an Abbe number of the second lens element is V2, an Abbe number of the fourth lens element is V4, and the following condition is satisfied:

30.0<V2+V4<65.0.

13. The optical imaging lens system of claim 10, wherein the focal length of the optical imaging lens system is f, the focal length of the second lens element is f2, and the following condition is satisfied:

−0.90<f/f2<−0.10.

14. The optical imaging lens system of claim 10, wherein a curvature radius of the object-side surface of the fifth lens element is R9, a curvature radius of the image-side surface of the fifth lens element is R10, and the following condition is satisfied:

8.00<(R9+R10)/(R9−R10).

15. The optical imaging lens system of claim 10, wherein the axial distance between the second lens element and the third lens element is T23, the axial distance between the third lens element and the fourth lens element is T34, and the following condition is satisfied:

1.80<T34/T23<30.00.

16. The optical imaging lens system of claim 10, wherein the axial distance between the first lens element and the second lens element is T12, the axial distance between the second lens element and the third lens element is T23, and the following condition is satisfied:

0.35<T12/T23.

17. The optical imaging lens system of claim 10, wherein the focal length of the optical imaging lens system is f, a focal length of the first lens element is f1, and the following condition is satisfied:

0.00<f/f1<1.10.

18. An optical imaging lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein a total number of lens elements of the optical imaging lens system is five, the image-side surface of the fourth lens element is concave in a paraxial region thereof, the image-side surface of the fourth lens element has at least one inflection point, the image-side surface of the fifth lens element is concave in a paraxial region thereof, and the image-side surface of the fifth lens element has at least one inflection point;
wherein a focal length of the optical imaging lens system is f, a focal length of the fourth lens element is f4, a focal length of the fifth lens element is f5, a curvature radius of the object-side surface of the third lens element is R5, a curvature radius of the image-side surface of the third lens element is R6, a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$-2.00<f/f4<0.12;$ $-0.20<f/f5<2.00;$ $-1.00<(R5+R6)/(R5-R6)<2.20;$ $0.30<CT1/CT2<2.20;$ $1.20<CT1/T45<15.00;$ $0.00<CT3/T34<0.85;$ and $0.38<T12/T23<2.20.$ 19. The optical imaging lens system of claim 18, wherein a curvature radius of the object-side surface of the first lens element is R1, the curvature radius of the image-side surface of the third lens element is R6, and the following condition is satisfied:

$-1.00<(R1+R6)/(R1-R6)<5.00.$

20. The optical imaging lens system of claim 18, wherein a curvature radius of the image-side surface of the fourth lens element is R8, a curvature radius of the object-side surface of the fifth lens element is R9, and the following condition is satisfied:

$0.90<R8/R9.$

21. The optical imaging lens system of claim 18, wherein an Abbe number of the fourth lens element is V4, and the following condition is satisfied:

$12.0<V4<35.0.$

22. The optical imaging lens system of claim 18, wherein the central thickness of the first lens element is CT1, the axial distance between the fourth lens element and the fifth lens element is T45, and the following condition is satisfied:

$2.00<CT1/T45<14.00.$

23. The optical imaging lens system of claim 18, wherein the image-side surface of the third lens element is convex in a paraxial region thereof, a composite focal length of the first lens element and the second lens element is f12, a composite focal length of the fourth lens element and the fifth lens element is f45, the focal length of the optical imaging lens system is f, a focal length of the third lens element is f3, and the following conditions are satisfied:

$-0.80<f12/f45<0.60;$ and $0.05<f/f3<1.30.$

24. The optical imaging lens system of claim 18, wherein an Abbe number of the third lens element is V3, and the following condition is satisfied:

$30.0<V3<70.0.$

25. The optical imaging lens system of claim 18, wherein a curvature radius of the object-side surface of the first lens element is R1, a curvature radius of the image-side surface of the first lens element is R2, and the following condition is satisfied:

$-3.00<(R1+R2)/(R1-R2)<-0.50.$

26. An optical imaging lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein a total number of lens elements of the optical imaging lens system is five, the object-side surface of the first lens element is convex in a paraxial region thereof, the fourth lens element has negative refractive power, the image-side surface of the fourth lens element is concave in a paraxial region thereof, the fifth lens element has positive refractive power, and the image-side surface of the fifth lens element is concave in a paraxial region thereof;

wherein a focal length of the optical imaging lens system is f, a focal length of the fourth lens element is f4, a focal length of the fifth lens element is f5, a composite focal length of the first lens element and the second lens element is f12, a composite focal length of the fourth lens element and the fifth lens element is f45, an axial distance between the second lens element and the third lens element is T23, an axial distance between the third lens element and the fourth lens element is T34, an axial distance between the object-side surface of the first lens element and the image-side surface of the fifth lens element is TD, an axial distance between the image-side surface of the fifth lens element and an image surface is BL, a curvature radius of the object-side surface of the fourth lens element is R7, a curvature radius of the image-side surface of the fifth lens element is R10, and the following conditions are satisfied:

$-3.00<f/f4<0.00;$ $0.00<f/f5<3.00;$ $-0.80<f12/f45;$ $1.80<T34/T23<30.00;$ $1.30<TD/BL<3.00;$ and $0.85<(R7+R10)/(R7-R10).$ 27. The optical imaging lens system of claim 26, wherein an Abbe number of the third lens element is V3, an Abbe number of the fourth lens element is V4, and the following conditions are satisfied:

$30.0<V3<70.0;$ and $12.0<V4<35.0.$

28. The optical imaging lens system of claim 26, wherein an axial distance between the first lens element and the second lens element is T12, an axial distance between the fourth lens element and the fifth lens element is T45, an Abbe number of the second lens element is V2, and the following conditions are satisfied:

$0.65 < T12/T45 < 3.00$; and $12.0 < V2 < 35.0$.

29. The optical imaging lens system of claim 26, wherein the image-side surface of the third lens element is convex in a paraxial region thereof, a central thickness of the first lens element is CT1, an axial distance between the fourth lens element and the fifth lens element is T45, and the following condition is satisfied:

$2.85 < CT1/T45 < 6.50$.

30. The optical imaging lens system of claim 26, wherein the focal length of the optical imaging lens system is f, a curvature radius of the image-side surface of the fourth lens element is R8, and the following condition is satisfied:

$0.50 < f/R8 < 4.00$.

31. The optical imaging lens system of claim 26, wherein a curvature radius of the image-side surface of the fourth lens element is R8, a curvature radius of the object-side surface of the fifth lens element is R9, and the following condition is satisfied:

$2.10 < R8/R9 < 50.00$.

32. The optical imaging lens system of claim 26, wherein a central thickness of the second lens element is CT2, a central thickness of the third lens element is CT3, the axial distance between the second lens element and the third lens element is T23, the axial distance between the third lens element and the fourth lens element is T34, and the following condition is satisfied:

$0.90 < (CT2+T23+CT3)/T34 < 1.40$.

33. The optical imaging lens system of claim 26, wherein a curvature radius of the object-side surface of the first lens element is R1, a curvature radius of the image-side surface of the second lens element is R4, a central thickness of the first lens element is CT1, a central thickness of the second lens element is CT2, and the following conditions are satisfied:

$-3.20 < (R1+R4)/(R1-R4) < -1.20$; and $1.50 < CT1/CT2 < 2.30$.

\* \* \* \* \*